(12) United States Patent
Ackermann et al.

(10) Patent No.: US 9,483,745 B2
(45) Date of Patent: Nov. 1, 2016

(54) BUSINESS NETWORK GUI

(75) Inventors: Joerg Ackermann, Heidelberg (DE); Ankur Bhatt, Bangalore (IN); Juergen Denner, Dudenhofen (DE); Christian Illenberger, Ludwigshafen (DE); Christoph Liebig, Heddesheim (DE); Gunther Rothermel, Rauenberg (DE); Sandra Voges, Bad Duerkheim (DE)

(73) Assignee: SAP SE, Walldorf (DE)

( * ) Notice: Subject to any disclaimer, the term of this patent is extended or adjusted under 35 U.S.C. 154(b) by 1341 days.

(21) Appl. No.: 12/938,982

(22) Filed: Nov. 3, 2010

(65) Prior Publication Data

US 2012/0110468 A1    May 3, 2012

(51) Int. Cl.
| | |
|---|---|
| G06F 3/0481 | (2013.01) |
| G06F 3/0482 | (2013.01) |
| G06F 3/0483 | (2013.01) |
| G06Q 10/10 | (2012.01) |
| G06Q 10/06 | (2012.01) |

(52) U.S. Cl.
CPC ..................................... *G06Q 10/06* (2013.01)

(58) Field of Classification Search
CPC .. G06F 9/4443; G06F 3/0481; G06F 3/0483; H04L 29/08072; H04N 21/4532; G06Q 10/10
USPC ......................................... 715/810, 764, 747
See application file for complete search history.

(56) References Cited

U.S. PATENT DOCUMENTS

| | | | | |
|---|---|---|---|---|
| 5,831,610 A | * | 11/1998 | Tonelli et al. | 715/735 |
| 5,883,621 A | * | 3/1999 | Iwamura | 725/37 |
| 6,040,834 A | * | 3/2000 | Jain et al. | 715/853 |
| 6,144,962 A | * | 11/2000 | Weinberg et al. | |
| 6,421,066 B1 | * | 7/2002 | Sivan | 715/712 |
| 6,467,052 B1 | | 10/2002 | Kaler et al. | |
| 6,477,572 B1 | * | 11/2002 | Elderton et al. | 709/224 |
| 6,535,227 B1 | * | 3/2003 | Fox et al. | 715/736 |
| 6,594,696 B1 | * | 7/2003 | Walker et al. | 709/223 |
| 6,601,233 B1 | | 7/2003 | Underwood | |

(Continued)

FOREIGN PATENT DOCUMENTS

WO    2004/081827    9/2004

OTHER PUBLICATIONS

'Hypergraph' [online]. Wikipedia, 2008, [retrieved on Oct. 7, 2010]. Retrieved from the Internet: <URL: web.archive.org/web/20080415090010/http:/en.wikipedia.org/wiki/Hypergraph>, 4 pages.

(Continued)

*Primary Examiner* — Amy Ng
*Assistant Examiner* — Erik Stitt
(74) *Attorney, Agent, or Firm* — Fish & Richardson P.C.

(57) ABSTRACT

A computer program product tangibly embodied in a computer-readable storage device includes instructions that, when executed, generate in a display device a graphical user interface comprising: a business view area with first objects representing business entities participating in a business network and second objects representing business connections between the business entities; and a connect view area with third objects representing applications participating in the business network and fourth objects representing logical interactions between the applications; wherein the graphical user interface dynamically updates the first, second, third and fourth objects with metadata that is at least in part automatically gathered in the business network.

20 Claims, 22 Drawing Sheets

(56) References Cited

U.S. PATENT DOCUMENTS

| | | | |
|---|---|---|---|
| 6,871,324 B2* | 3/2005 | Hand et al. | 715/734 |
| 6,897,867 B2* | 5/2005 | Katayama | 345/440 |
| 6,898,783 B1* | 5/2005 | Gupta et al. | 717/105 |
| 6,970,844 B1* | 11/2005 | Bierenbaum | 705/39 |
| 7,421,699 B2 | 9/2008 | Brendle et al. | |
| 7,475,350 B2* | 1/2009 | Boyles et al. | 715/734 |
| 7,587,675 B2* | 9/2009 | Cunningham et al. | 715/734 |
| 7,590,718 B2* | 9/2009 | Gilmour et al. | 709/223 |
| 7,702,639 B2 | 4/2010 | Stanley et al. | |
| 7,716,587 B2* | 5/2010 | Firebaugh et al. | 715/734 |
| 7,831,453 B2 | 11/2010 | Das et al. | |
| 7,848,942 B2 | 12/2010 | Sadiq | |
| 7,912,749 B2 | 3/2011 | Wong et al. | |
| 8,234,582 B1* | 7/2012 | Haynes et al. | 715/764 |
| 8,438,533 B2 | 5/2013 | Fritzsche et al. | |
| 2002/0083090 A1* | 6/2002 | Jeffrey et al. | 707/501.1 |
| 2004/0148586 A1 | 7/2004 | Gilboa | |
| 2006/0031540 A1 | 2/2006 | Purontaus et al. | |
| 2006/0143306 A1* | 6/2006 | Fijnvandraat | 709/238 |
| 2007/0006152 A1* | 1/2007 | Ahmed et al. | 717/122 |
| 2007/0106520 A1 | 5/2007 | Akkiraju et al. | |
| 2009/0182595 A1 | 7/2009 | Milaski | |
| 2009/0248473 A1 | 10/2009 | Doenig et al. | |
| 2009/0254840 A1* | 10/2009 | Churchill et al. | 715/753 |
| 2010/0064225 A1* | 3/2010 | Cunningham et al. | 715/736 |
| 2010/0131857 A1 | 5/2010 | Prigge | |
| 2010/0302248 A1 | 12/2010 | Houghtlin et al. | |
| 2011/0153386 A1 | 6/2011 | Kim et al. | |
| 2011/0246899 A1* | 10/2011 | Kwon et al. | 715/736 |
| 2012/0023409 A1* | 1/2012 | Gvirtsman et al. | 715/735 |
| 2012/0089685 A1 | 4/2012 | Hoffmann et al. | |
| 2012/0096425 A1* | 4/2012 | Gupta et al. | 717/101 |
| 2012/0124140 A1 | 5/2012 | Bhatt et al. | |
| 2012/0270563 A1* | 10/2012 | Sayed | 455/456.3 |
| 2013/0159865 A1* | 6/2013 | Smith et al. | 715/737 |

OTHER PUBLICATIONS

'Metamodeling' [online]. Wikipedia, 2007, [retrieved on Oct. 7, 2010]. Retrieved from the Internet: <URL: web.archive.org/web/20071214003316/http:/en.wikipedia.org/wiki/Metamodeling>, 9 pages.
'Business Process Modeling Notation' [online] Wikipedia, 2007, [retrieved on Oct. 7, 2010]. Retrieved from the Internet: <URL: web.archive.org/web/20071018142021/http:/en.wikipedia.org/wiki/BPMN>, 7 pages.
'BPMN 2.0 Metamodel Implementation for Eclipse: Get it and Use it' [online]. SAP, 2010, [retrieved on Oct. 7, 2010]. Retrieved on the Internet: <URL:www.sdn.sap.com/irj/scn/go/portal/prtroot/docs/library/uuid/c 04f0691-0a76-2d10-1098-ec518f7bdf68?QuickLink=index&overridelayout=true>, 13 pages.
'Modeling Your First Process with SAP NetWeaver Business Process Management' [online] SAP AG, 2009, [retrieved on Oct. 7, 2010]. Retrieved from the Internet: <URL: http://www.sdn.sap.com/irj/scn/go/portal/prtroot/docs/library/uuid/c052052e-fbab-2b10-0d9a-9feed5463589?QuickLink=index&overridelayout=true>, 66 pages.
OMG, "Business Process Model and Notation (BPMN), Version 2.0" *Object Management Group*, 2010, pp. 1-550.
'BPMN to BPEL case study solution in VIATRA2' [online] Bergmann and Horvath, 2009, [retrieved on Oct. 7, 2010]. Retrieved from the Internet: <URL: http://is.tm.tue.nl/staff/pvgorp/events/grabats2009/submissions/grabats2009_submission_21.pdf>, 5 pages.
SAP AG, "SAP NetWeaver Business Process Management: Create and Adapt Business Processes Fast and Flexibly," *SAP Solution Brief*, 2008, 4 pages.
OMG, "Business Process Model and Notation (BPMN), Version 1.2," *Object Management Group*, 2009, pp. 1-316.
European Examiner Per Heselius, European Search Report & Written Opinion for Application No. EP 11007406, dated Nov. 22, 2011, 9 pages.
Jay J: "ActiveWin: Microsoft Vision 2000 Professional—Review", Internet Citation, Oct. 27, 2000, XP002351329, Retrieved from the Internet: URL: http://www.activewin.com/reviews/software/apps/ms/visio2k/index.shtml [retrieved on Oct. 26, 2005].
Tim Anderson: "Microsoft Visio 2002", Personal Computer World, London, GB, Jun. 28, 2001, pp. 1-4, XP002422569.
Tim Anderson: "Microsoft Visio 2003", Personal Computer World, London, GB, Sep. 18, 2002, pp. 1-2, XP002422570.

* cited by examiner

BUSINESS NETWORK GUI

TECHNICAL FIELD

This description relates to a business network graphical user interface (GUI).

BACKGROUND

Business networks occur in many aspects of commerce. Each business network includes a set of participants, such as people, organizations, companies, who collaborate in various ways to conduct business. For example, the business involves manufacturing, storing, distributing or servicing goods, or delivering a product or service to a customer. Many of such participants have implemented enterprise resource planning (ERP) systems and other application systems for these purposes, to support their internal processes. For example, cross-organizational activities related to services delivered by the business network can interface with (or run within) application systems of one or more participants. Some business network participants may use additional information systems and process orchestrations based on information technology (IT) to deliver the service.

Business processes running end-to-end in a business network are executed on local systems of various participants. Today, participants who wish to enable end-to-end business network operations and provide visibility into business network performance, may need to implement costly, risky and time consuming projects to deliver process integration into local applications. In the context of business networks, this business-IT dilemma may be exaggerated by a disconnect (within or between participating organizations) between, on the one hand, their individual IT situation, and on the other, their business language. The cost and complexity is further multiplied by the number of participants who must collaborate in a business network to achieve a common goal. This number ranges from fifty (at the low end) to many hundred in some enterprise settings. For each participant, the integration, operation and visibility needs to be addressed case-by-case, covering the end-to-end flow of business information and values, from activities within the private domain of one participant (e.g., the solicitation of a quote) to the partner's corresponding business activities (e.g., the confirmation of an order) and follow-up activities by related participants (e.g., production orders, shipment notice, etc.). Each partner-to-partner collaboration in the network needs to be implemented against autonomously designed information systems and integration technologies.

SUMMARY

This document describes examples of business network GUIs. As described below, a GUI can include a number of objects that represent aspects of the business network. In some implementations, respective objects can represent and correspond to business entities, business connections between the business entities, applications, and logical interactions between the applications. For example, the objects can be distributed in a business view area and a connect view area in the GUI. The GUI can be dynamically updated with metadata that is automatically gathered in the business network.

In a first aspect, a computer program product tangibly embodied in a computer-readable storage device includes instructions that, when executed, generate in a display device a graphical user interface comprising: a business view area with first objects representing business entities participating in a business network and second objects representing business connections between the business entities; and a connect view area with third objects representing applications participating in the business network and fourth objects representing logical interactions between the applications; wherein the graphical user interface dynamically updates the first, second, third and fourth objects with metadata that is at least in part automatically gathered in the business network.

Implementations can include any or all of the following features. The first, second, third and fourth objects are interactive and allow a user to perform drill-in and drill-out operations to select a level of detail for presenting at least part of the business network. The drill-in and drill-out operations provide user navigation between (i) a first participant pair from the first and second objects, and (ii) a second participant pair from the third and fourth objects, based on associations between the first and second pairs in the metadata. The graphical user interface further comprises a grid view area with fifth objects representing the applications and middleware participating in the business network and sixth objects representing interactions and message exchanges between the applications and middleware, the grid view area showing a technical level of the business network. At least one of the business view and connect view areas includes a history function providing user navigation to an earlier state of the business network, the earlier state based on earlier recorded metadata. At least one of the business view and connect view areas includes a fifth object representing a business document, the fifth object connected to at least one of the first, second, third and fourth objects corresponding to a participant-to-participant exchange of the business document in the business network.

The graphical user interface further comprises a network space area configured for maintaining a predefined subset of the business network and for editing or adding to metadata of the predefined subset. The network space area further comprises a collaboration area configured for users from parts of the business network to exchange communications including at least a representation showing at least some of the first, second, third and fourth objects. The collaboration area is configured for a communication recipient to add the representation to the predefined subset, the representation interacting with at least one existing object in the predefined subset. The graphical user interface further comprises a snapshot area showing a static snapshot of at least a subset of the business network.

The graphical user interface further comprises layers selectively applicable to the business view area or the connect view area, each layer including additional information from the metadata for the business view area or the connect view area. The additional information includes at least one information type selected from: relevant business documents, relevant agreements, interface names, middleware components, and message volume.

In a second aspect, a system includes: a display device; a processor; and a computer-readable storage device having stored therein instructions that when executed by the processor generate on the display device a graphical user interface comprising: a business view area with first objects representing business entities participating in a business network and second objects representing business connections between the business entities; and a connect view area with third objects representing applications participating in the business network and fourth objects representing logical interactions between the applications; wherein the graphical user interface dynamically updates the first, second, third and fourth objects with metadata that is at least in part automatically gathered in the business network.

Implementations can include any or all of the following features. The graphical user interface further comprises a grid view area with fifth objects representing the applications and middleware participating in the business network and sixth objects representing interactions and message exchanges between the applications and middleware, the grid view area showing a technical level of the business network. At least one of the business view and connect view areas includes a history function providing user navigation to an earlier state of the business network, the earlier state based on earlier recorded metadata. The graphical user interface further comprises a network space area configured for maintaining a predefined subset of the business network and for editing or adding to metadata of the predefined subset. The network space area further comprises a collaboration area configured for users from parts of the business network to exchange communications including a representation showing at least some of the first, second, third and fourth objects. The collaboration area is configured for a communication recipient to add the representation to the predefined subset, the representation interacting with at least one existing object in the predefined subset. The graphical user interface further comprises layers selectively applicable to the business view area or the connect view area, each layer including additional information from the metadata for the business view area or the connect view area.

In a third aspect, a method includes: displaying a business network view to negotiation parties who are currently negotiating a contract with rights and obligations for participating in a business network, the business network view comprising at least (i) a business view with first objects representing business entities participating in the business network that correspond to at least one of the negotiation parties and second objects representing business connections for the represented business entities, or (ii) a connect view with third objects representing applications participating in the business network and fourth objects representing logical interactions between the applications; modifying the business network view based on input and displaying a modified business network view that includes a change in the rights or obligations of at least one of the negotiation parties; and updating and storing a contract document for the negotiation parties after displaying the modified business network view, the contract document updated based on the change to reflect agreement on at least the change.

Implementations can provide any or all of the following advantages: Providing a business network GUI that reflects multiple dimensions of the business network. Providing a business network GUI that shows the business network from at least a business perspective, an application perspective, and a system and technical messaging perspective. Providing a business network GUI that: allows the business network to be managed in its entirety; shows a unified view of the business network; connects the dimensions of the business network; and offers network and process visibility.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

In the following examples, business networks are described in a broader sense that includes real-life business entities (such as companies or organizational units) and their relations, as well as their IT landscapes (such as ERP and other application systems) which interact with each other.

Figure 1:
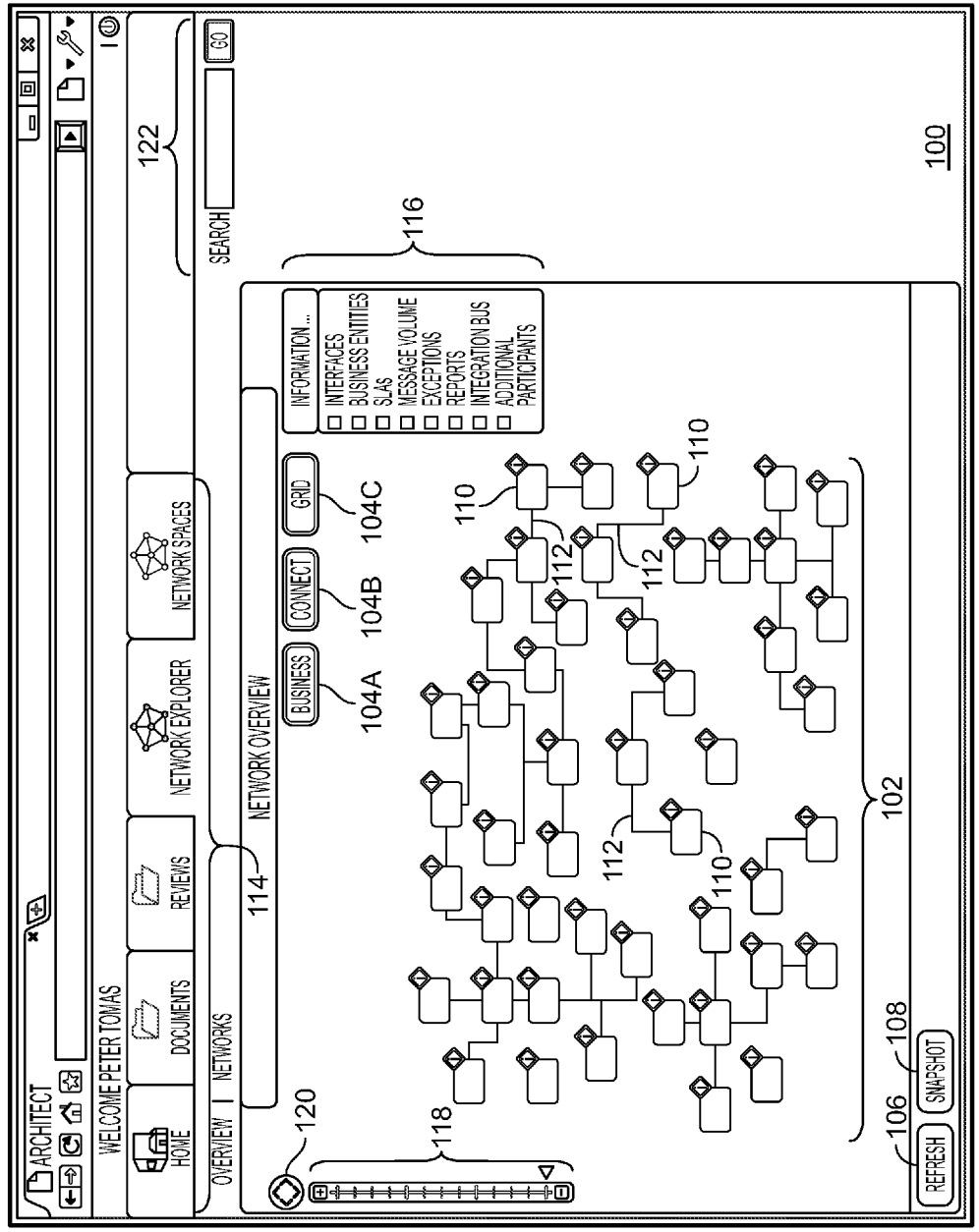
FIG. 1 shows a business network GUI with a connect view area.

FIG. 1 shows a business network GUI 100 with a connect view area 102. In some implementations, the connect view area 102 allows a user to overview and obtain detailed information on a number of application programs participating in a business network, as well as logical interactions between the applications. The GUI 100 can present different aspects of the business network in response to user selection of any of controls 104A-C in the GUI. In some implementations, the user chooses the control 104A for a business view, the control 104B for a connect view (e.g., as illustrated), and the control 104C for a grid view. Examples of connect, business and grid views will first be described with reference to FIGS. 1, 2 and 3, respectively.

The GUI 100 can present information based on metadata that is automatically collected in the business network. Any business network features that are of interest can be tracked and represented in the model. Examples of such features include, but are not limited to: participants such as business entities, systems, relationships, applications, interfaces, middleware, process steps, and documents. For example, software entities such as agents or proxies can be activated by one or more business network participants to discover aspects of the business network by collecting metadata. Examples of metadata that can be collected include, but are not limited to:

Organization master data from one or more applications, such as data about: contacts, sales organization, purchase planning organization, distribution center(s), and ship-to-locations;

Product or service master data, such as data about product or service types, manufacturing, warehousing, and delivery modes;

Process interfaces for the application(s), such as information describing inbound and outbound interfaces;

Relationships, such as information about flows that integrate an application into one or more other applications;

Contractual metadata, such as key performances indicators (KPIs) and service level agreements (SLAs);

System information, such as data about applications and implemented integration buses;

Physical network information, such as data about transaction volumes, IP networks, and firewalls; and Runtime information, such as data about transaction volumes, exceptions, and business documents.

Other kinds of metadata can be collected and used in some implementations. The gathered metadata is used to generate a business network model as a representation of the business network as it exists in the real world. This business network model is then used for generating the views in the GUI 100.

Accordingly, the connect view area 102 represents the state of the business network based on the discovered metadata. The user can activate a refresh control 106 to trigger an update of the GUI 100 with the most up-to-date metadata about the shown aspects of the business network. In some implementations, the control 106 causes the system to determine whether additional metadata has been submitted by the agent(s) or proxies and the data analysis and processing, if necessary, have been performed. If so, the GUI 100 is then regenerated in whole or in part. In some implementations, the refresh control 106 can trigger the agent(s) to be activated for additional metadata collection.

If updated metadata is gathered over a period of time, the real time view of the business network generated in the GUI 100 can vary over time based on the state of the business network. The user can activate a snapshot control 108 to take a snapshot of the business network at that particular time. That is, the snapshot control 108 creates a snapshot record of the current version of the metadata at the time the control is activated. Such a snapshot can be used for record keeping, for improvement planning, or to investigate network errors, to name just a few examples.

Here, the connect view area 102 includes multiple application objects 110, each representing and corresponding to an application program or application system in the business network. For example, an ERP system can be represented in whole or in part. The objects 110 that are shown in the GUI 100 at any given time may represent all applications in the business network, or only a subset thereof. While the objects 110 look essentially identical at this zoom level, each one of them represents a separate type of application having its own name. Upon further zooming-in, the objects 110 are individualized to distinguish different application types from each other.

The GUI 100 includes objects 112 that represent logical interactions between the applications. While one or more of the objects 110 could appear with any connection in some situations, each one of the objects 112 is associated with at least one of the objects 110. For example, one or more of the objects 112 can represent the interaction between respective applications that are run by different participants in the business network. As another example, one or more of the objects 112 can represent interactions between applications controlled by a single participant.

The GUI 100 includes a toolbar 114 that allows the user to navigate between various components in the system that is managing the model of the business network. For example, a Network Explorer icon is currently selected, which indicates that the GUI 110 is designed for use in exploring one or more existing business networks. Other components in this example include: Network Spaces, which will be described in examples below, Home, Documents and Reviews.

A layer area 116 can be used to add, or remove, particular aspects, parts or characteristics of the business network in the presented view. Here, the layer area 116 includes respective controls for Interfaces, Business Document Entities, SLAs. Message Volume, Exceptions, Reports, Integration Bus, and Additional Participants. Other implementations can use more or fewer layer categories, and/or different ones. Here, none of the layer categories is currently selected, and this means that no objects corresponding to respective ones of the layer categories are shown in the connect view area 102.

The ability to add or remove certain network aspects in the display is based on information layers in the metadata. The information layers allow for blending in additional information. For example, layer information can be added as an overlay on the business network map, while the map itself (e.g., participants and connections, etc.) is not affected by such layer information. More than one layer can be activated at the same time. In some implementations, the respective layer categories correspond to respective layers in the metadata that can be arbitrarily included or excluded when generating a view.

The GUI 100 includes a slider control 118 for the user to choose a level of detail for viewing the business network. The slider control 118 can be automatically readjusted to another level (higher or lower) upon certain changes in the GUI 100, for example when switching between views of the business network. Here, the slider control 118 is currently set at a lowest level, corresponding to a least amount of detail being shown in the presented view. The GUI 100 here also includes a pan control 120 for the user to navigate up/down or left/right in the presented view, for example when the business network is too large to be shown at once.

The GUI 100 includes a search function 122 with which the user searches for particular aspects of the business network. Results of the search can be listed in the GUI 100 and the user can choose which result(s) to inspect. In some implementations, the GUI can perform automatic navigation to the search result(s), whether at the same level of detail or at a different level. In some implementations, the search is performed only among the objects of the business network map and those of any active layer(s), such that metadata of the objects in any currently inactive layer(s) is not included in the search.

Figure 2:
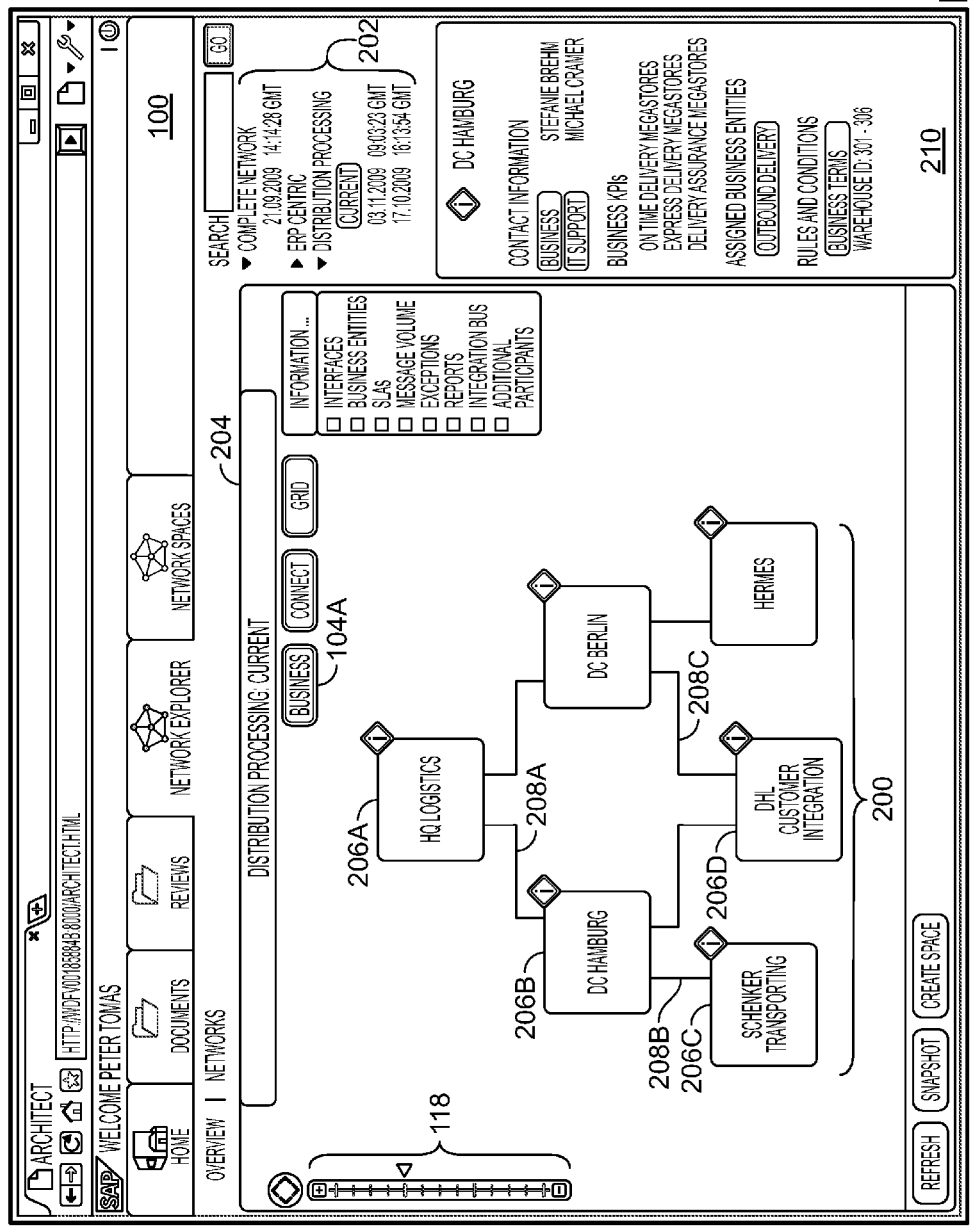
FIG. 2 shows a business view area in the business network GUI of FIG. 1.

FIG. 2 shows a business view area 200 in the business network GUI 100 of FIG. 1. The business view area 200 here replaces the connect view area that was discussed above. For example, the business view area 200 is presented in response to the user selecting the control 104A and setting the slider control 118 to a higher level of detail than before.

The business view area 200 displays the business network from a business point of view, in a way a business person might talk about the network. Such a business view often shows business entities, such as companies, organizational units, or divisions. Examples of business entities include, but are not limited to: the headquarters of a company, or a specific distribution center or warehouse.

The GUI 100 here includes status area 202 showing status information about the version of the metadata shown in this view. For example, the current business view relates to distribution processing between participants in the business network, as also indicated in a view header 204. The status area 202 shows that a snapshot of the "Complete Network" was taken on Sep. 9, 2009, and that the view of the distribution processing in the business view area 200 is the "Current" one. Earlier snapshots of the distribution processing are available from November 3 and October 17 of the same year.

The business view area 200 here includes objects 206 representing business entities that participate in the business network. Here, the object 206A is labeled Headquarters (HQ) Logistics, the object 206B labeled Distribution Center (DC) Hamburg, the object 206C labeled Schenker Transporting, and the object 206D labeled DHL Customer Integration. One interpretation of this part of the business network is that HQ Logistics is a headquarters organization that is connected to at least two distribution centers, including the DC Hamburg. Each distribution center interacts with one or more transporters or cargo management vendors, including Schenker Transporting and DHL Customer Integration.

The business view area 200 includes objects 208 representing business connections between the represented business entities. Each business connection can correspond to one or more data exchanges or other interactions that the business entities engage in. For example, the object 208A can represent an "outbound delivery" process that HQ Logistics initiates vis-à-vis DC Hamburg when goods are to be transferred to the distribution center. Similarly, the objects 208B and 208C can represent "shipment" procedures executed by Schenker Transporting or DHL Customer Integration, respectively.

Each one of the objects 206 and 208 corresponds to metadata and is associated with information further describing the participant or connection. Here, the GUI 100 includes an information area 210 that can be updated based on which object(s) the user selects. For example, the information area 210 currently shows information about DC Hamburg, including: contact information, business KPIs, assigned business document entities, rules and conditions. An information category can include a link to the corresponding information. Other information categories can be used.

The objects 206 and 208 are interactive. First, the user can select any of the objects (e.g., by a single click) to update the information area 210 with corresponding information. Second, the user can activate any of the objects (e.g., by double clicking) to drill in to more detailed information in the model of the business network metadata. Such a drill-down operation causes the GUI 100 to present information at a higher level of detail, for example by generating a different view. In some implementations, a drill-out operation can be initiated which redirects the user to another level of less detail based on where the operation is initiated.

Figure 3:
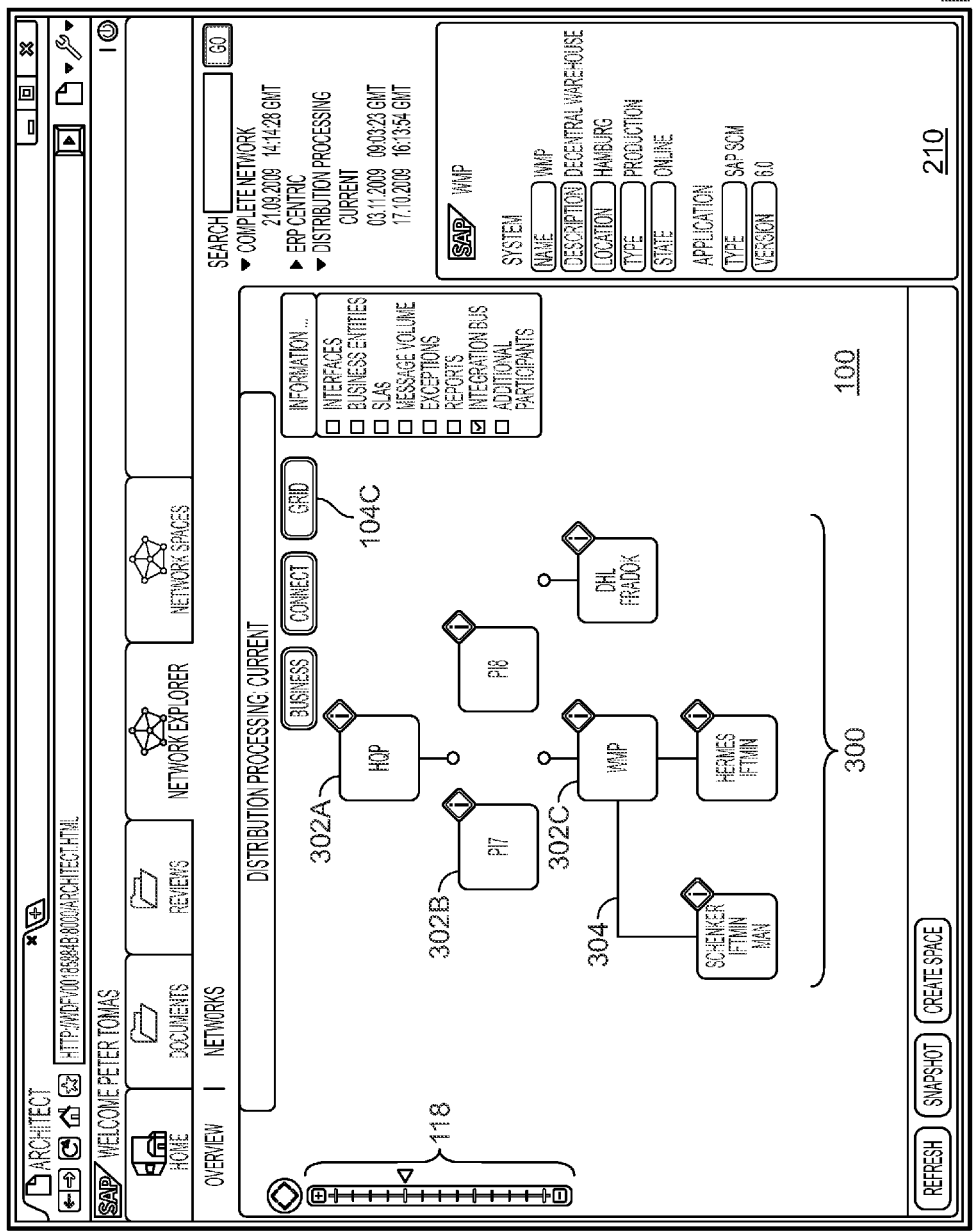
FIG. 3 shows a grid view area in the business network GUI of FIG. 1.

FIG. 3 shows a grid view area 300 in the business network GUI 100 of FIG. 1. For example, the area 300 is presented in response to the user activating the control 104C. The grid view area shows a technical level of the business network. The slider control 118 shows the level of detail in the current view.

The grid view area 300 includes objects 302 that represent applications or middlewares participating in the business network. Such applications or middleware can be implemented on one or more hardware devices. For example, each of the objects 302 can be implemented and executed on one or more server devices. For example, the object 302A here represents a headquarters production (HQP) application, the object 302C a warehouse management process (WMP) application, and the object 302B one or more middleware components that integrate the production and warehouse management applications. For example, the HQP application runs production processes at the headquarters. Moreover, PI7 on the object 302 denotes a middleware component. Also, the information area 210 has been updated with WMP application information.

The grid view area 300 further includes objects 304 that represent interactions and message exchanges. For example, the object 304 can represent an interaction between the warehouse management application and an interface at a transporter vendor application.

The objects 302 and 304 are interactive, for example such that the information area 210 can be updated, and for drilling operations relative to the model.

Figure 4:
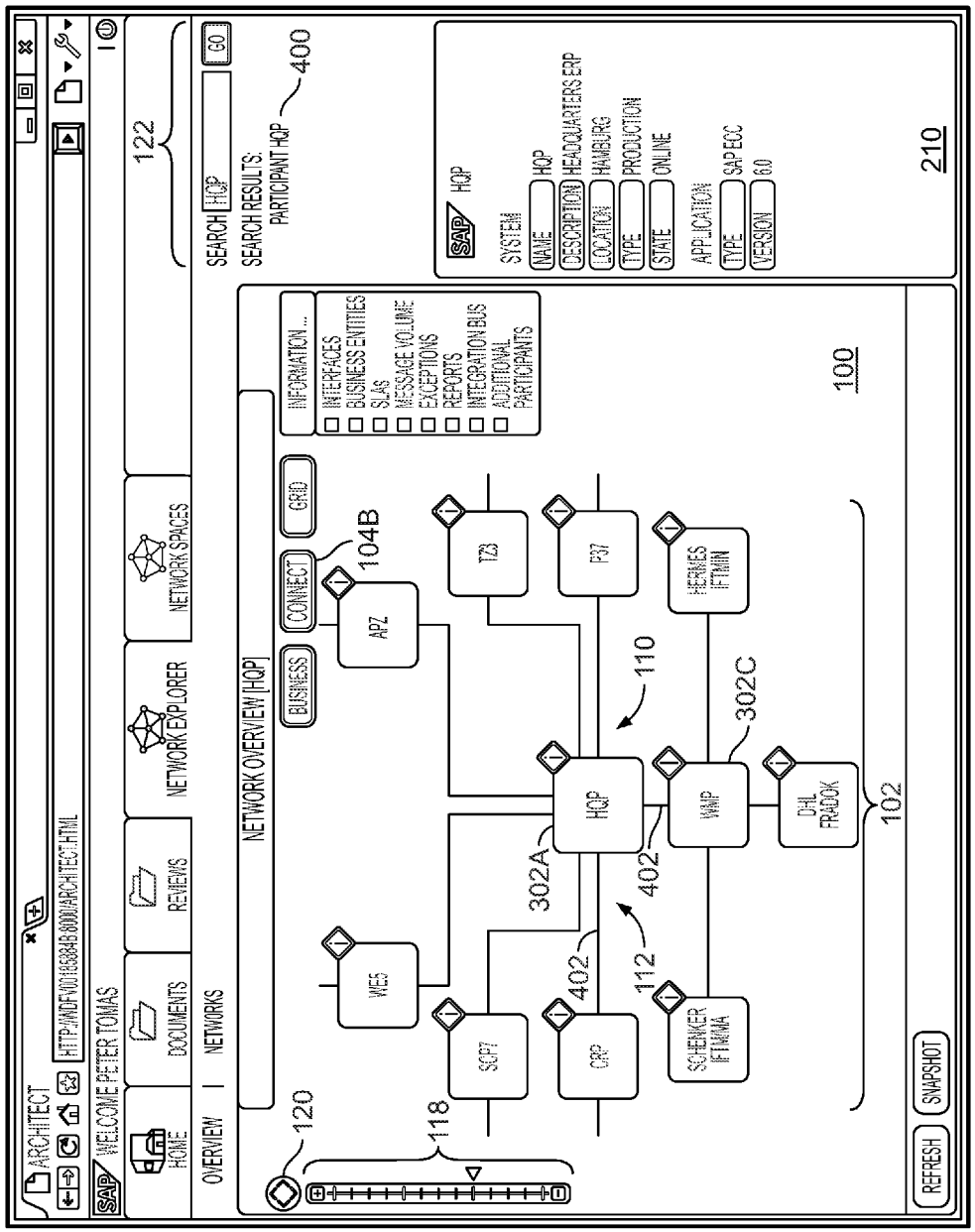
FIG. 4 shows another example of the connect view area in the business network GUI of FIG. 1.

FIG. 4 shows another example of the connect view area 102 in the business network GUI 100 of FIG. 1. The connect view area 102 can be presented in response to user activation of the control 104B. The connect view area 102 has different contents than in the example above. For example, the user has here searched for "HQP" using the search function 122. A search result 400 indicates that a participant was found in the search. For example, the user selects the search result 400 to update the connect view area 102 with the search result. In some implementations, selecting the search result 400 causes the connect view area to zoom to a suitable level of detail for showing the HQP participant and its surroundings, while the objects for the rest of the business network remain available in the view and can be reached using the pan control 120. In other implementations, selection of a search result triggers a select operation so that only the found object(s) and a surrounding network area of predefined size are included in the view. The slider control 118 shows the current level of detail.

Here, the object 302A representing the HQP application, and the object 302C representing the WMP application, are examples of the objects 110 that were mentioned earlier. Similarly, objects 402 representing logical interactions are examples of the objects 112. The information area 210 is updated based on selecting the object 302A. Accordingly, the connect view area 102 now shows the user relevant and interactive information based on the performed search, and the user can perform navigation or drilling operations in the results, or run another search, to name just two examples.

Figure 5:
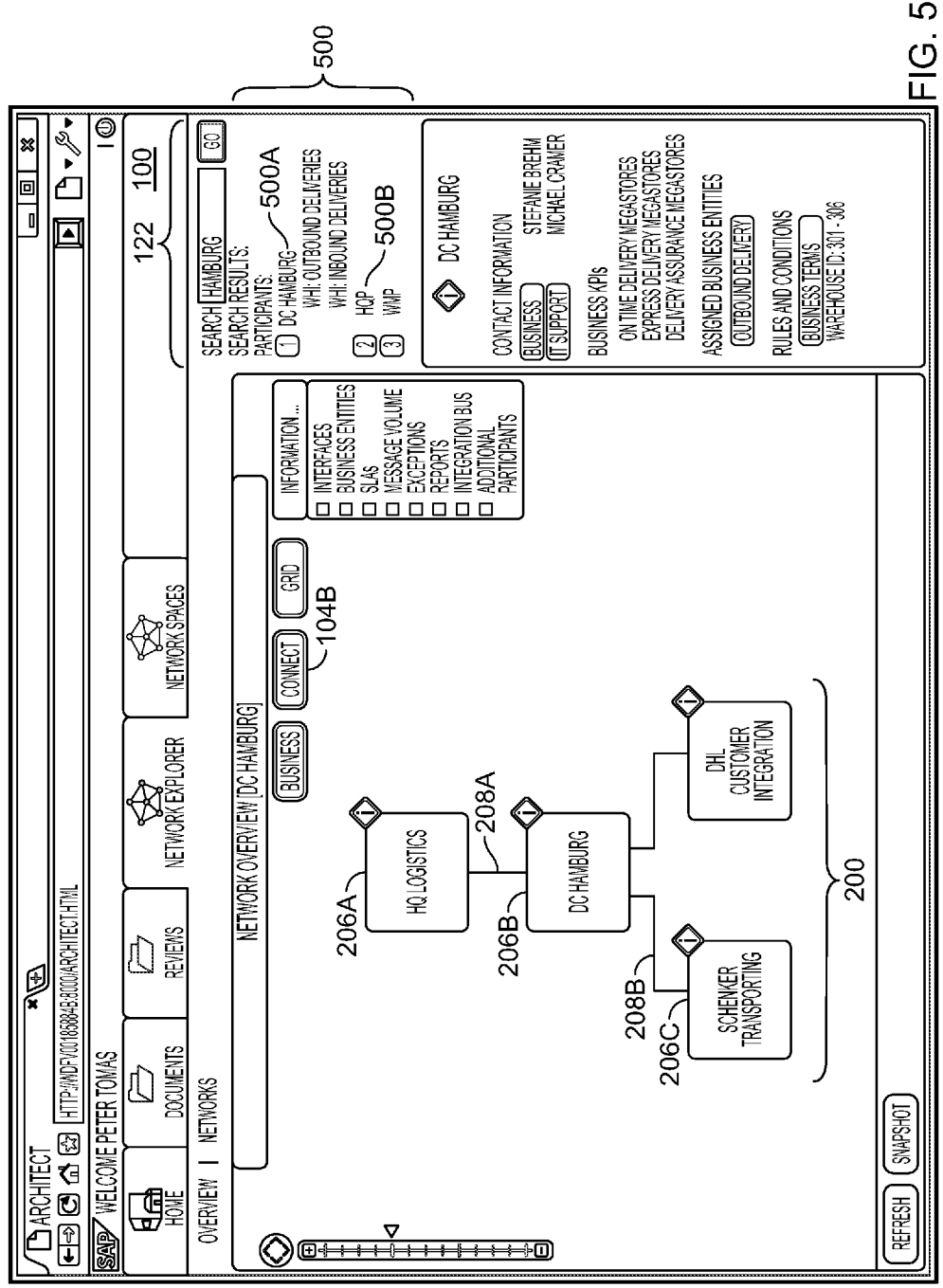
FIG. 5 shows another example of the business view area in the business network GUI of FIG. 2.

FIG. 5 shows another example of the business view area 200 in the business network GUI 100 of FIG. 2. Here, the user had initiated a search for "Hamburg". Search results 500 are cross-view and include, for example, as top-hit a "DC Hamburg" business entity 500A from the business view and two application systems "HQP" 500B and "WMP" 500C from the connect view. The business entity 500A is currently selected and therefore the business network GUI shows "DC Hamburg" and its surrounding network in the business view. In some implementations, the top-level search result might be automatically selected.

The business view area 200 currently shows the objects 206A-D corresponding to participating business entities, and the participant relationships represented by the objects 208A-C. Particularly, the business entity 500A is represented by the object 206B, while the objects 206A, 206C and 206D represent applications connected to it. Accordingly, the business view area 200 currently allows the user to browse or further drill in on the search result 500A.

If the user, however, would alternatively select search result 500B, the resulting view is a connect view area with an "HQP" object and its surrounding network.

Figure 6:
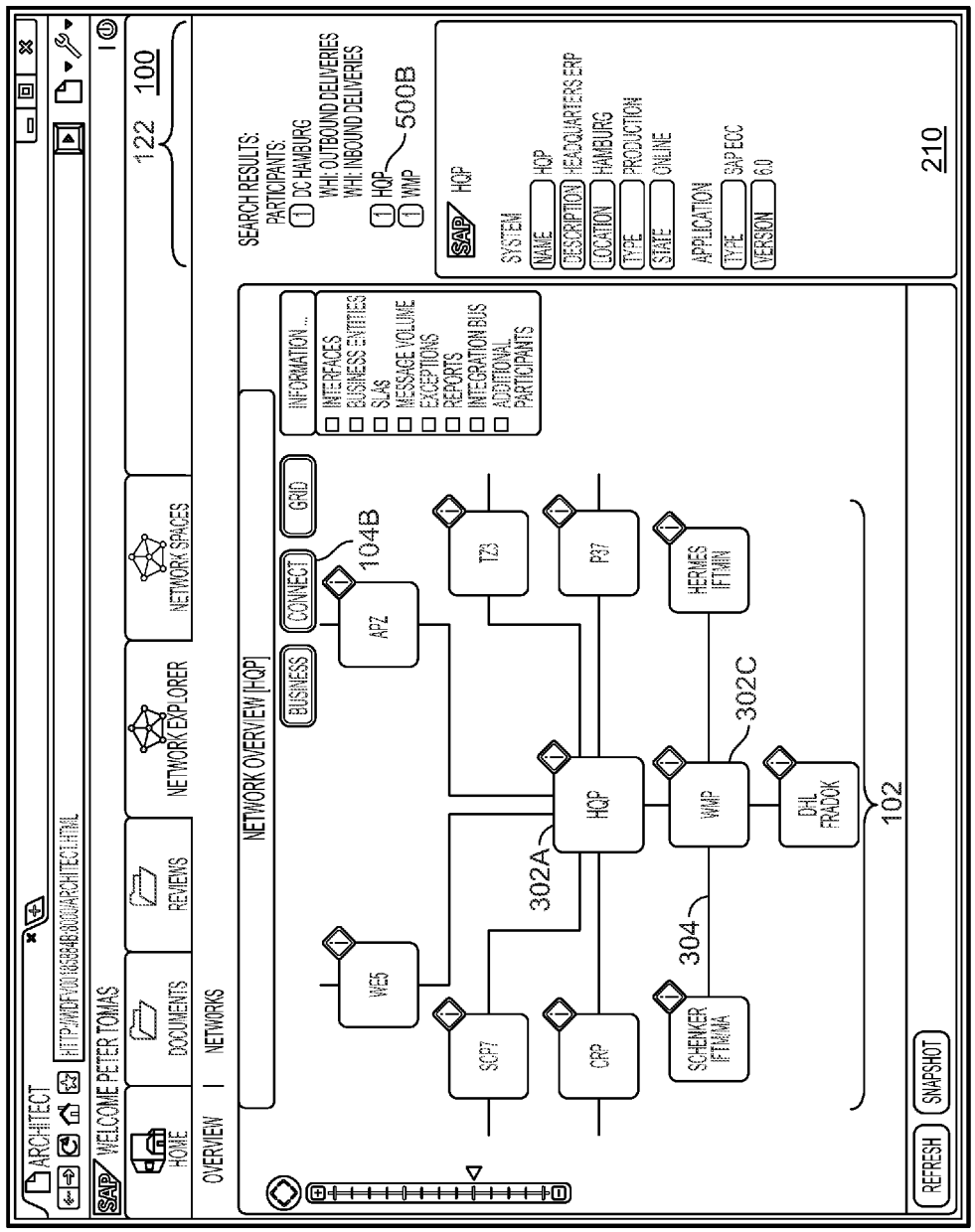
FIGS. 6-9 show other examples of the connect view area in the business network GUI of FIG. 1.

FIGS. 6-9 show other examples of the connect view area 102 in the business network GUI 100 of FIG. 1. Particularly, FIG. 6 shows the connect view area 102 when the HQP result 500B and the control 104B have been selected. The connect view area 102 here includes objects for participant applications, such as the HQP object 302A and the WMP object 302C among others, and objects for their logical interactions, such as the object 304 among others. The HQP object 302A, currently centered in the connect view area 102, is responsive to the "Hamburg" entry in the search function 122 because the HQP application is located in Hamburg, as indicated by the information area 210.

Figure 7:
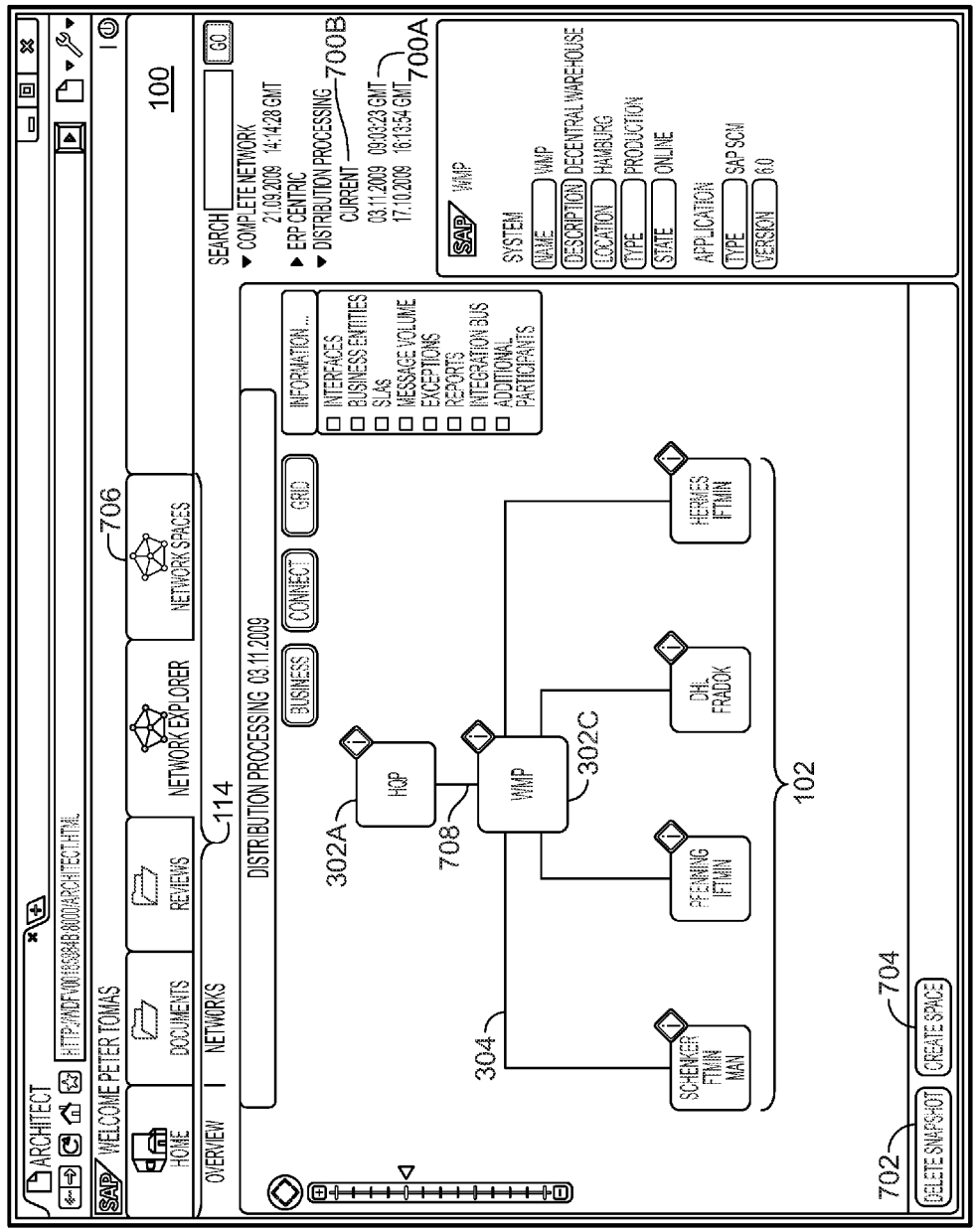

Here, the user clicks on the object 302C to re-focus the connect view area 102 on the WMP application in the business network. The user will also choose to view a snapshot of historical metadata, as will now be described. FIG. 7 shows the resulting connect view area 102 in the GUI 100. Here, the user has activated a snapshot control 700A, which in this example shows a view of the business network as it was discovered on Nov. 3, 2009. Similar to the previous example, the connect view area 102 here includes participant application objects, such as the WMP object 302C and the HQP object 302A, and objects for their logical interactions, such as the object 304. The WMP object 302C is currently centered in the connect view area 102. In contrast, a control 700B can be used to show the current state of the business network. A delete snapshot control 702 can be used to delete the currently selected snapshot.

A create space control 704 can be used to create a business network "space," and a control 706 in the toolbar 114 can be used to activate an editing tool. Below, examples of business network spaces are described with reference to FIGS. 14-16, and examples of editing are described with reference to FIGS. 17-21.

The objects 302A and C here represent a pair of applications that interact with each other, and they are implemented in respective systems that likewise have an interaction relationship, and the systems in turn are operated or controlled by business entities that participate in the business network and also have an interaction relationship. In a sense, applications, systems and business entities, among others, are all participants in the business network, although some of them are at different levels of abstraction than others, meaning that all types of participants do not appear in the same view.

With brief reference again to FIG. 5, that figure shows the objects 206A and B representing the HQ Logistics business entity and the DC Hamburg business entity, respectively. In a sense, the pair of objects 302A and C represents a more detailed view of the pair of business entities represented by the objects 206A and B. A pair of interacting business entities can have more than one pair of applications or application systems at a lower level.

Figure 8:
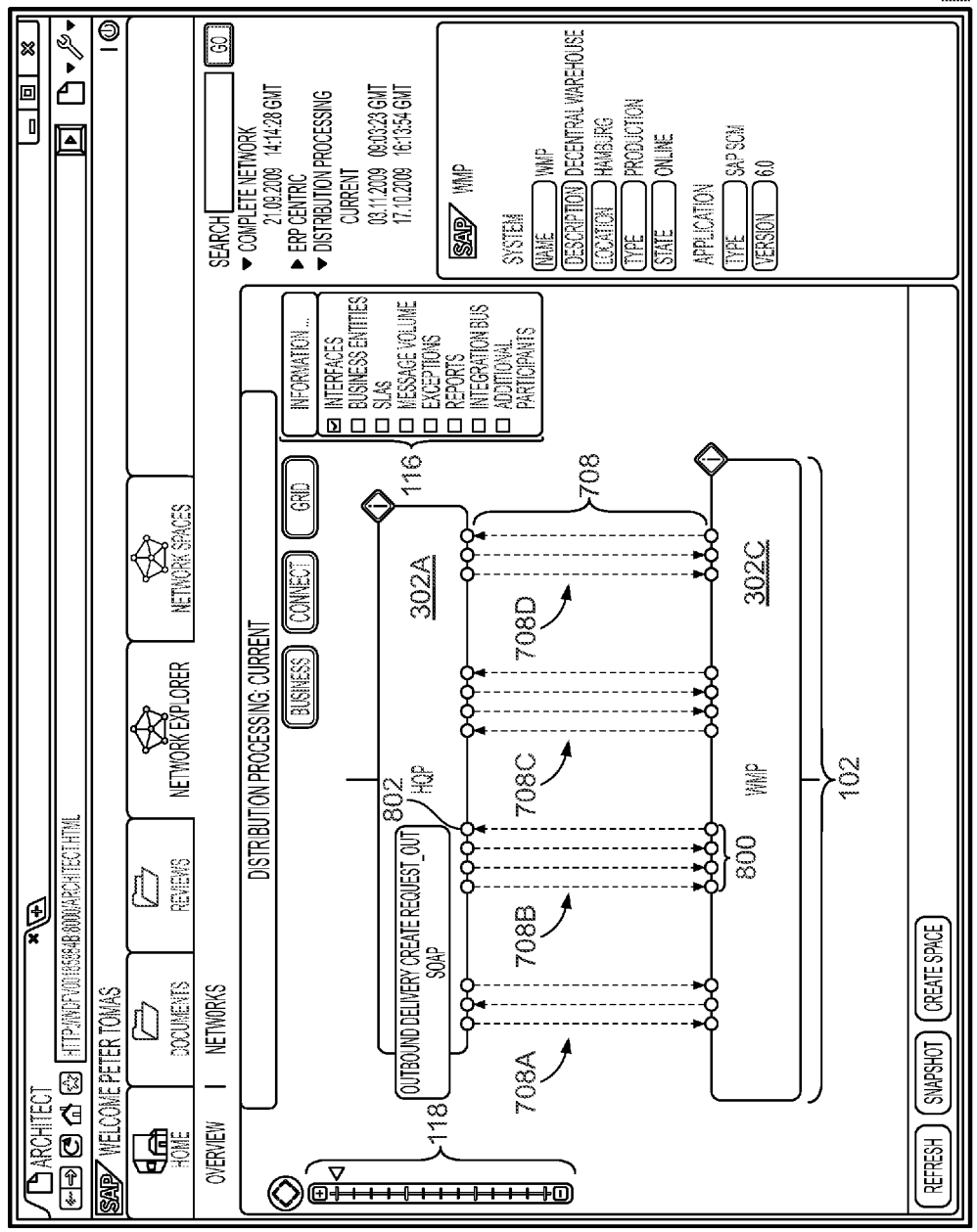

Here, the user wishes to drill in on the present-day relationship between the HQP and WMP applications. The user therefore selects the current control 700B and drills-in (e.g. by double click) on object 708 that connects the HQP object 302A and the WMP object 302C. Accordingly, the GUI 100 provides user navigation between on one hand the pair of participants and on the other hand one or more pairs of participants at another level based on object associations in the metadata. FIG. 8 shows the connect view area 102 after the user has drilled in on the relationship 708 and has additionally selected the layer category Interfaces in the layer area 116. The slider control 118 reflects the level of detail in the present view. In some implementations, the layer area 116 is automatically updated to reflect the type of view that the user has navigated to.

The object 708 has been expanded to show interaction objects 708A-D representing respective interactions between the HQP and WMP applications. For example, the interaction object 708B here includes an object 800 representing three messages or other communications from the HQP application to the WMP application. Similarly, the interaction object 708B here includes an object 802 representing a single message/communication in the opposite direction.

Figure 9:
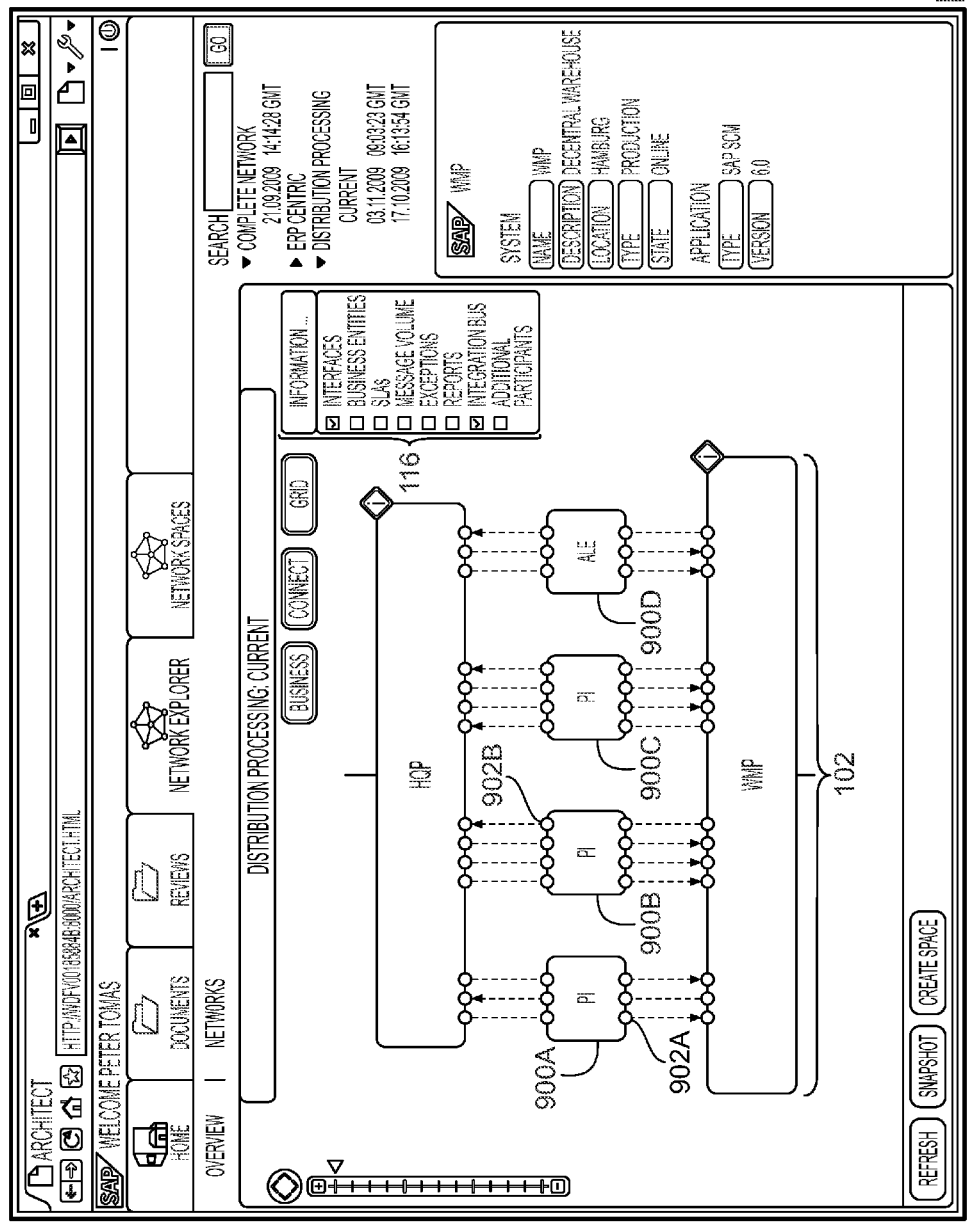

The connect view area 102 currently does not show the middleware component(s) involved in the HQP-WMP interaction. The user can reveal the middleware by selecting the Integration Bus category in the layer area 116. FIG. 9 shows the connect view area after the user selects the Integration Bus category in the layer area 116. Here, middleware objects 900A-D are shown, one for each of the HQP-WMP interactions. Objects 902A represent interfaces between the middleware and the WMP application, and objects 902B interfaces between the middleware and the HQP application. Layer(s) can be added to, or removed from, the view using the layer area 116.

With brief reference again to FIG. 2, assume that the user selects or otherwise activates the object 208A that represents the business connection between HQ Logistics (object 206A) and DC Hamburg (object 206B). This lets the user drill in to a higher level of detail to further explore the business connection between these business entities. Examples of this will now be described.

Figure 10:
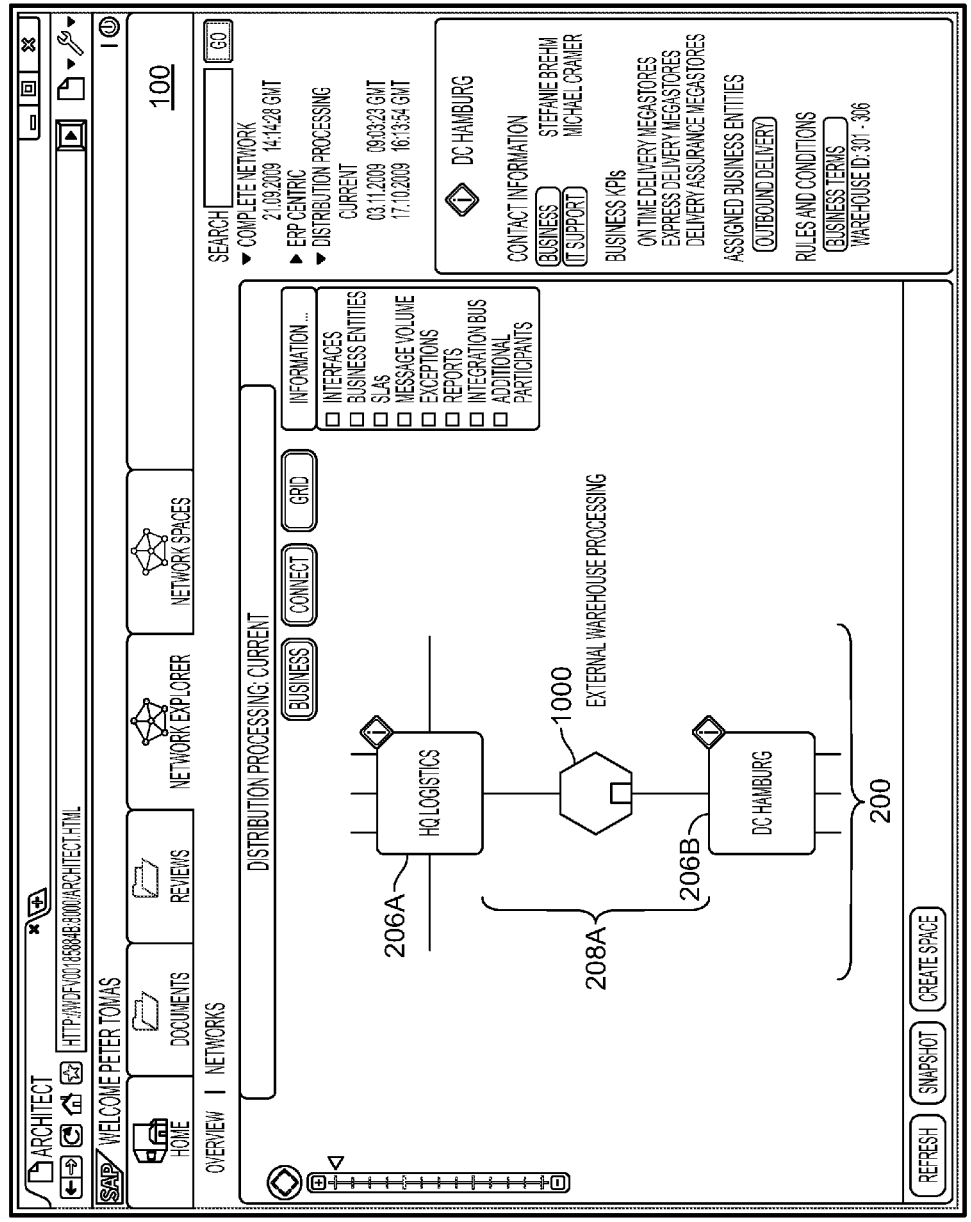
FIGS. 10-16 show other examples of the business view area in the business network GUI of FIG. 2.

FIGS. 10-16 show other examples of the business view area 200 in the business network GUI 100 of FIG. 2. In FIG. 10, the business view area 200 has the objects 206A and B associated with each other using the object 208A. The business connection object 208A has here been expanded to show an External Warehouse Processing object 1000, indicating that the metadata and the accompanying model include further details about the business connection that the user can explore. Here, the user selects or otherwise activates the object 1000.

Figure 11:
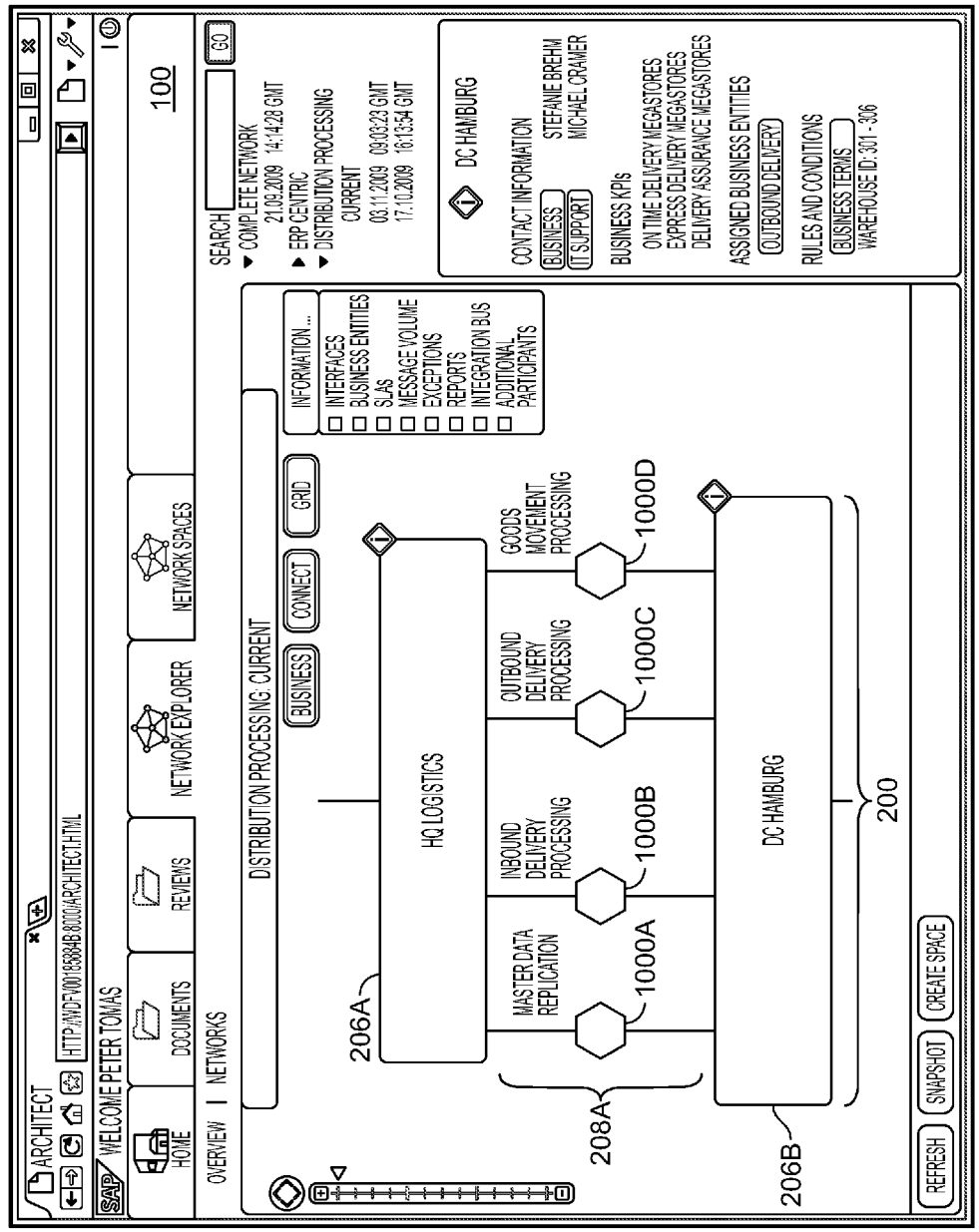

FIG. 11 shows the business view area 200 where the business connection object 208A has been expanded into respective External Warehouse Processing objects 1000A-D. The objects 1000A-D are labeled Master Data Replication, Inbound Delivery Processing, Outbound Delivery Processing and Goods Movement Processing, respectively. Here, the user selects or otherwise activates the Outbound Delivery Processing object 1000C.

Figure 12:
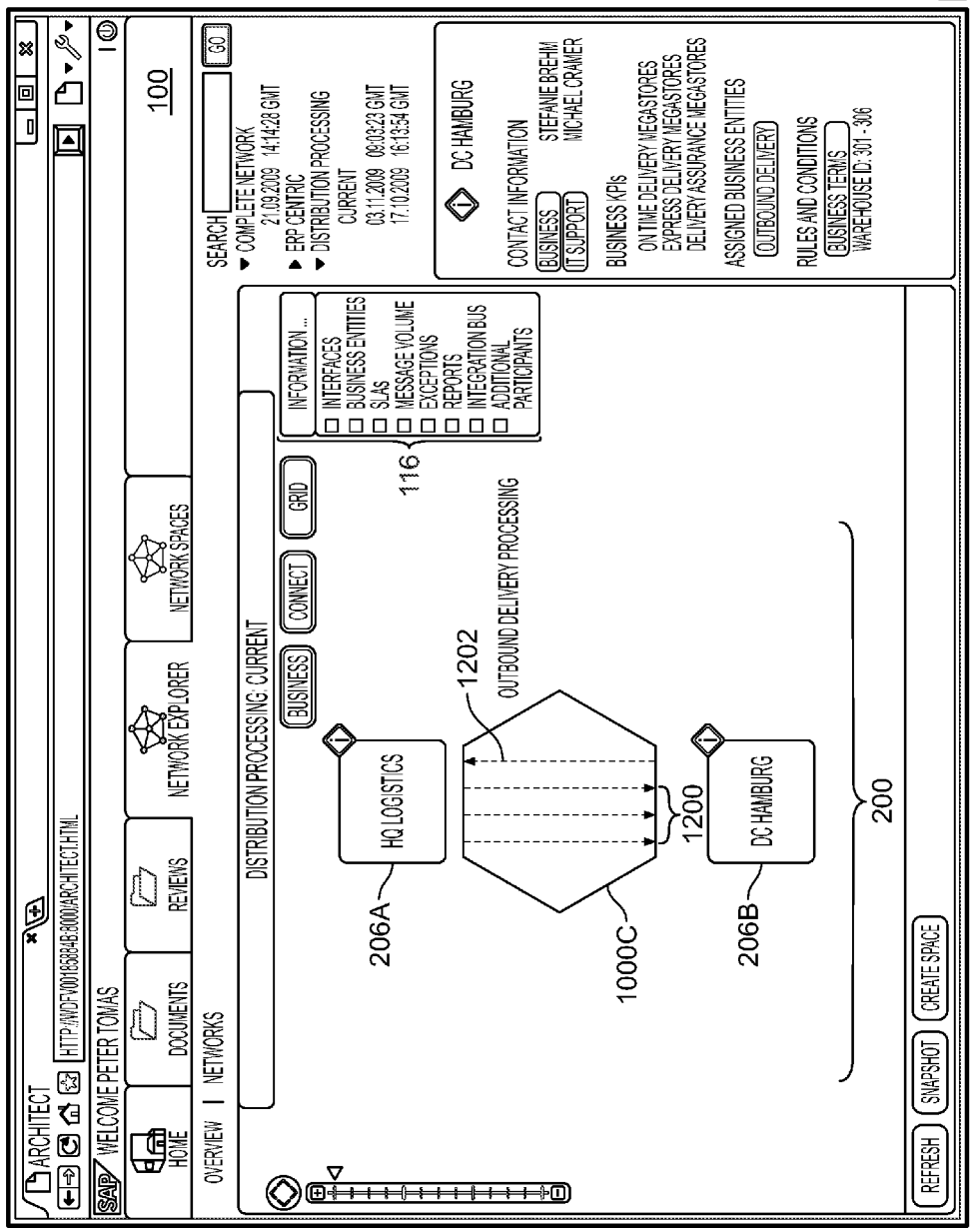

FIG. 12 shows the business view area 200 with the Outbound Delivery Processing object 1000C, the HQ Logistics object 206A and the DC Hamburg object 206B. Here, the Outbound Delivery Processing object 1000C has been expanded to show individual business flow objects 1200 and 1202. Remaining ones of the External Warehouse Processing objects that the user did not select are not currently visible. Here, the objects 1200 represent business flows from HQ Logistics to DC Hamburg, and the object 1202 represents a business flow in the opposite direction.

Figure 13:
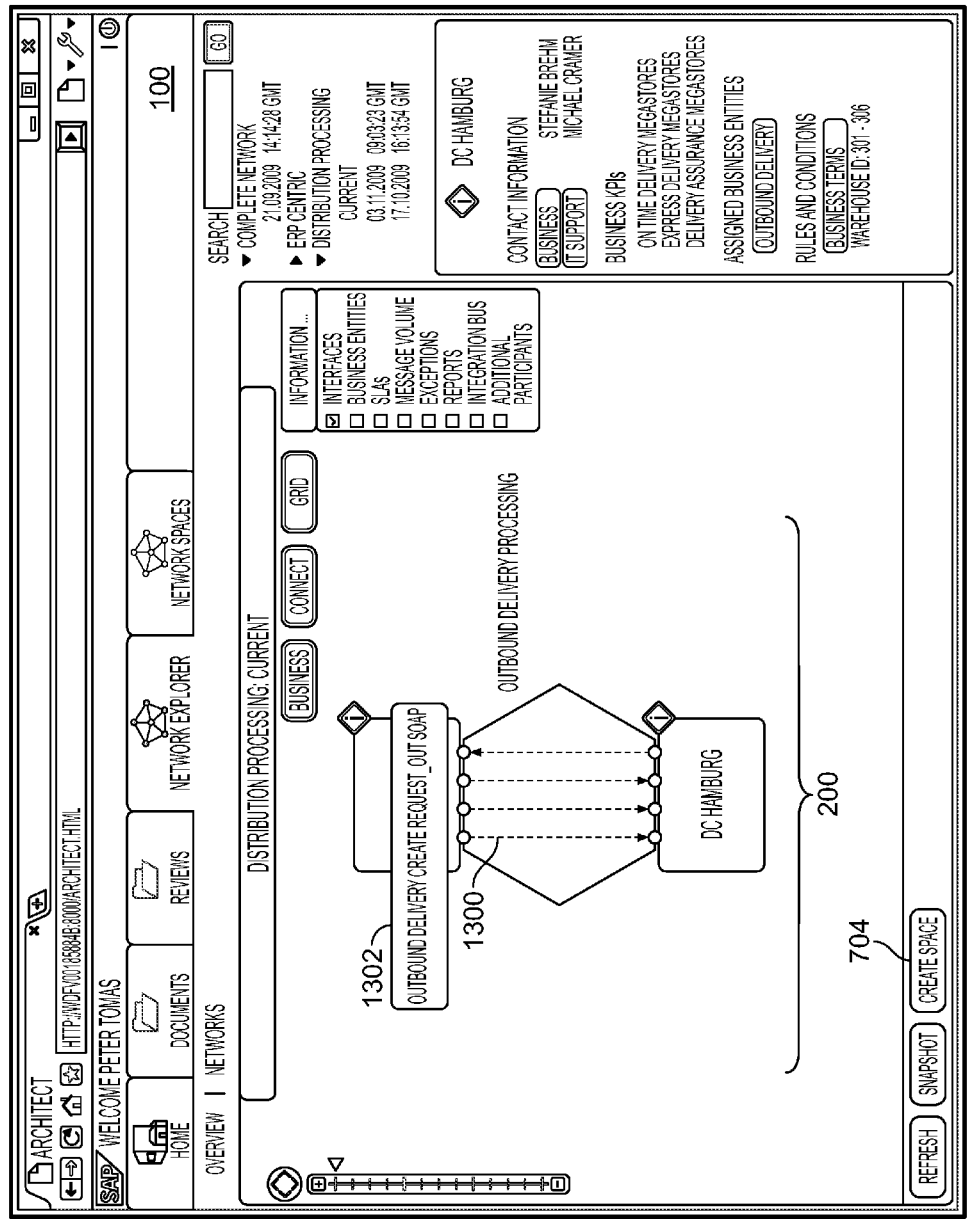

The user now wishes to inspect any interface(s) involved in the connection between the business entities HQ Logistics and DC Hamburg. The user therefore selects an Interfaces category in the layer area 116 to add interfaces to the displayed view. FIG. 13 shows the business view area 200 where interface objects such as 1300 represent interfaces in the HQ Logistics system. To see more details, the user could for example move the mouse to the object 1300 and a detailed area 1302 appears, to show the interface details OutboundDeliveryCreateRequest_Out SOAP.

A network space is a subnetwork of the overall business network, containing a predefined subset of the participants and connections, not necessarily all participants or connections. In some implementations, the network space can be explored in the same ways as the overall business network, for example by different views, participants and connections, information layers, etc. Users can define multiple network spaces.

The following are examples why a network space is created. For example, using a network space can reduce the complexity of the resulting view for the user, and allows the user to browse only the part of the overall business network that is relevant to the specific situation or project. As another example, a network space can be edited to enrich or enhance the business network.

An editing tool lets the user maintain the network space and edit or add to the metadata to make a modification. For example, an enhancement can be made with the explicit intention of later implementing a change in the actual business network. For example, this can allow the user to explore different network designs or experiment with possible enhancements of the business network before they are physically implemented. The editing tool can also be activated by the control 706.

An enrichment, on the other hand, can be made with the intention of furthering the understanding of the "as-is" business network (i.e., the business network as it currently exists). For example, an enrichment can add information that had not been automatically discovered; can replace discovered information with customer-specific values; or can otherwise supply additional semantic information. In a sense, the enrichment seeks to improve the documentation about the business network and is not directed toward changing the actual business network.

The concept of a network space is different from, but related to, the concept of a snapshot. A snapshot is a static capture of a subnetwork, while a network space is not static (for example, the network space can change over time). For example, a snapshot can be taken of an existing network space, or a snapshot can be used as the starting point for creating a new network space.

Figure 14:
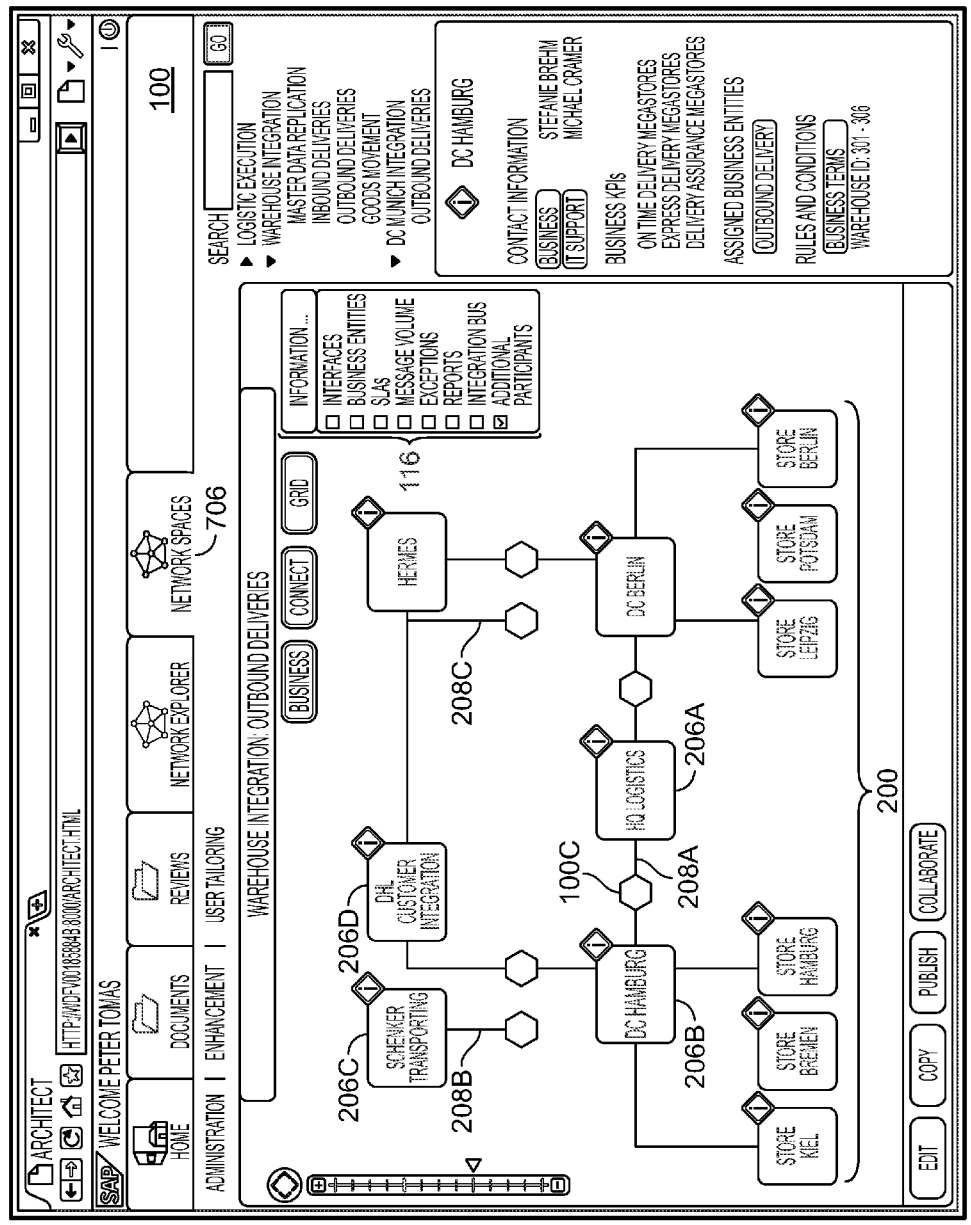

The following examples refer to the use of network spaces. Assume that the user changes to the Network Space application by using control 706 and selects a network space called "Outbound Delivery." FIG. 14 shows the resulting GUI 100 with the business view area 200.

The business view area 200 here shows business entity participants represented by the objects 206A-D among others, and connections between them represented by the objects 208A-C among others. The object 1000C is shown connecting the DC Hamburg and HQ Logistics business entities with each other. In the layer area 116, the category Additional Participants has been selected, which here means that other business entities, such as respective stores (e.g., store Kiel) of the distribution centers (e.g., DC Hamburg), are also represented.

Figure 15:
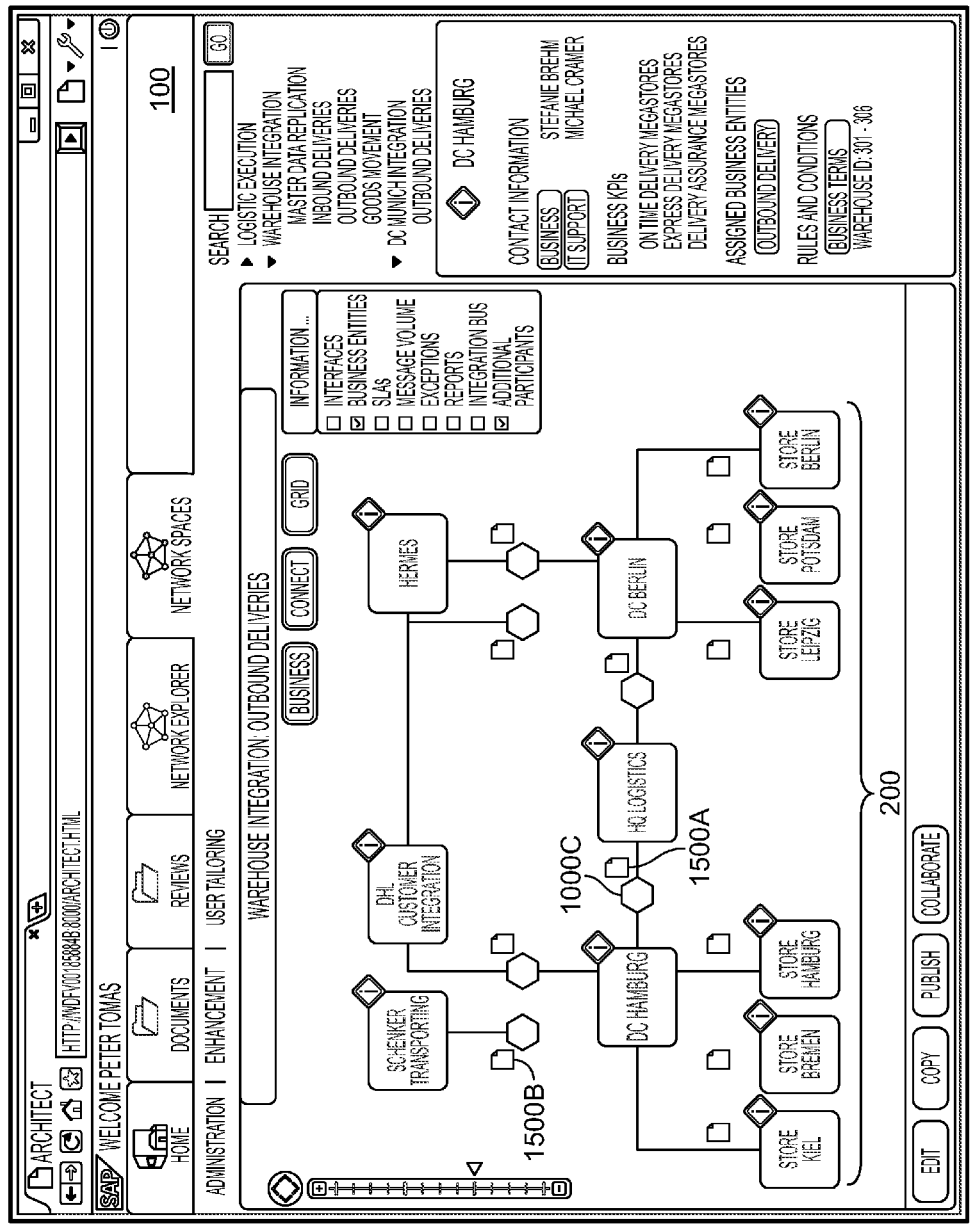

Assume now that the user wishes to see business documents or other electronic records that relate to the shown interactions. The user therefore also selects a Business Document Entities category in the layer area 116 to have the corresponding object(s) be presented in the view. FIG. 15 shows the business view area 200 where objects 1500A-B are shown to represent business document entities between respective participants. For example, the object 1500A relates to the object 1000C for the connection between the HQ Logistics and DC Hamburg business entities; the object 1500B relates to a corresponding object for the connection between the DC Hamburg and Schenker Transporting business entities. The user now activates the object 1000C.

Figure 16:
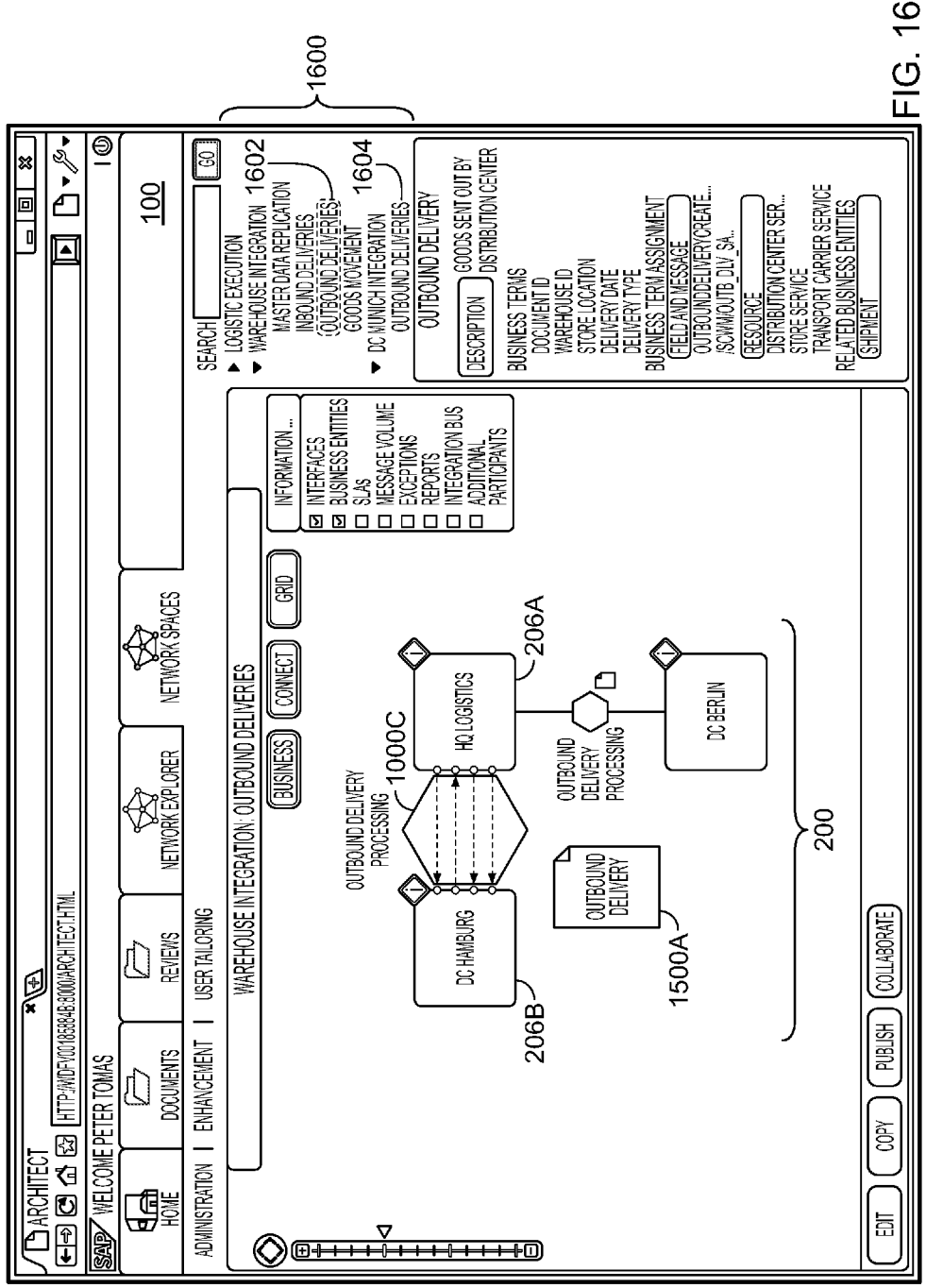

FIG. 16 shows the business view area 200 zoomed in on the objects 206B and 206A; the Outbound Delivery Processing object 1000C and the Outbound Delivery document 1500A are also visible, among others. A navigation area 1600 allows the user to visit different network spaces within the editing tool. Currently, an outbound deliveries space 1602 is active. For example, the user can select the outbound deliveries space 1602 to arrive at the GUI 100 with the business view area 200 as shown in FIG. 14. Note that only object 1000C (and none of the other External Warehouse Processing objects in FIG. 10) was chosen to be part of the network space 1602 because this space shows only the outbound delivery related part of the business network.

Assume now that the user wishes to explore possible enhancements of the business network. Enhancements can be done for any of multiple reasons. For example, the user may wish to enrich the model with information that cannot be automatically discovered or to modify the information that was discovered. As another example, the user may have plans to modify the actual business network.

In this particular example, the user is going to model the integration of another distribution center (called "DC Munich") into the overall model for the business network. This can be done by modifying the metadata model, or creating a new one, in an editing tool. That is, the control 706 replicates the metadata model of the business network in an editing view where aspects can be added, deleted or modified to indicate a change in the business network.

The user now instead selects an outbound deliveries space 1604 within another category "DC Munich integration. This will open up another network space area where the user can perform modeling and other modifications based on the details from previous views.

Figure 17:
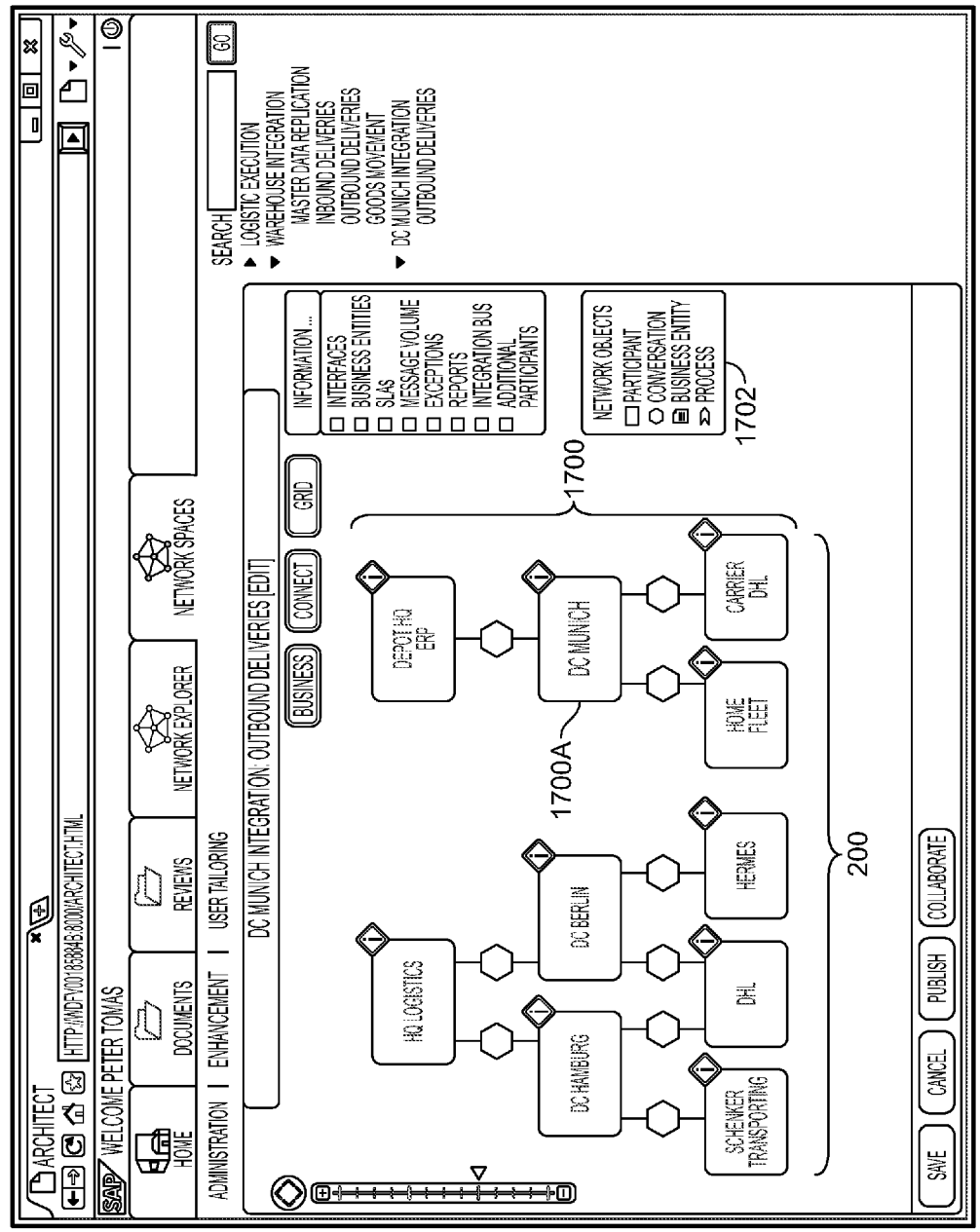
FIGS. 17-18 show other examples of the business view area with added objects for a participant.
Figure 18:
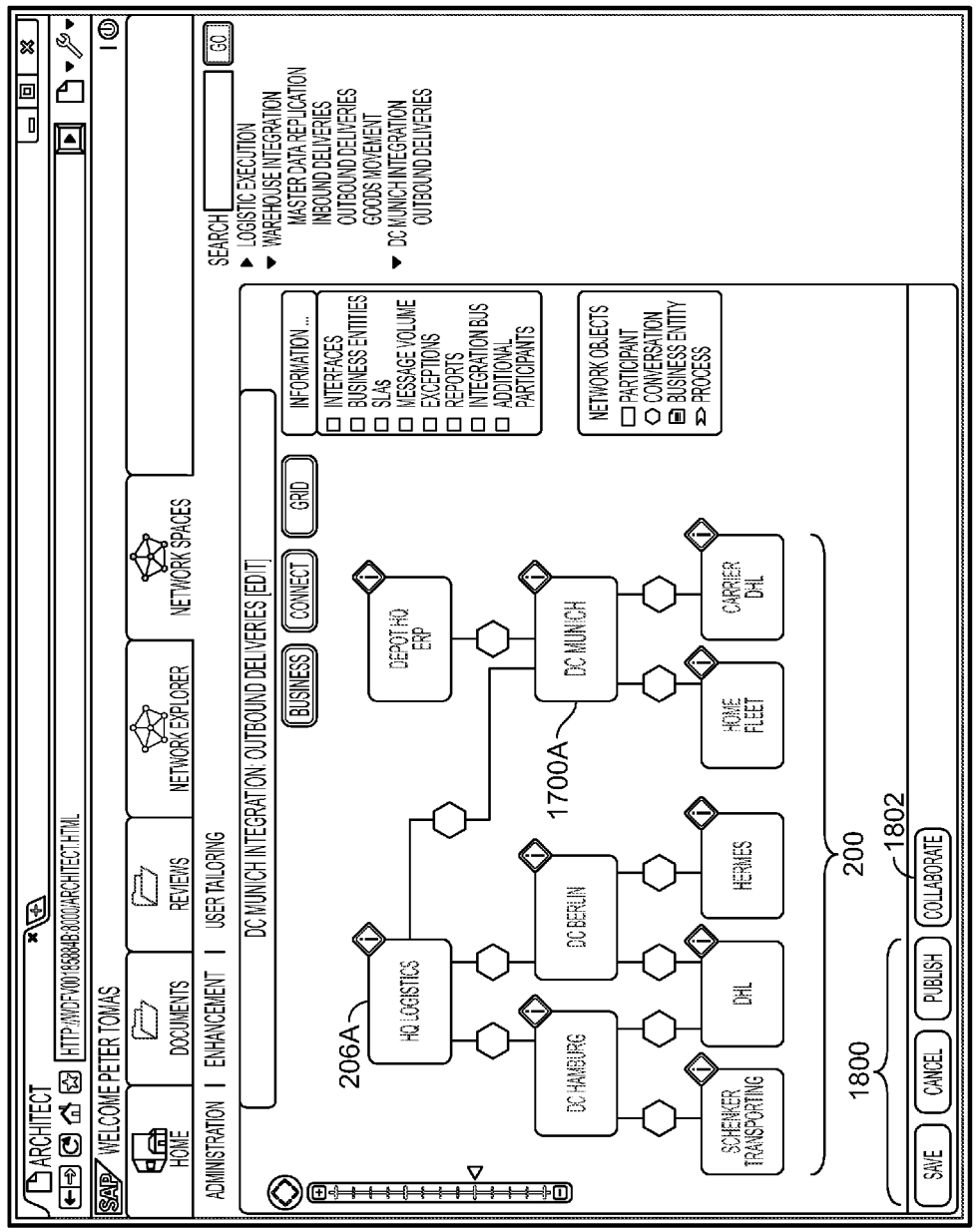

FIGS. 17-18 show other examples of the business view area 200 with added objects for a participant. For example, FIG. 17 shows the business view area 200 within the editing tool, where objects 1700 representing DC Munich and other business entities are included next to the objects for the HQ Logistics, etc. Here, an object 1700A represents the DC Munich business entity, for example based on modeling that participant entirely within the editing tool, or based on gathered metadata about DC Munich. An entity area 1702 allows the user to select one or more types of objects that the user wishes to modify or otherwise work with. Here, the user selects the type for a "Conversation" object. FIG. 18 shows the business view area 200 from FIG. 18 where a conversation object 1800 has been added, connecting the objects 206A and 1700A to each other. The user can save, cancel or publish the currently modeled business network using controls 1800.

Assume now that the user should specify further details for the interaction of DC Munich with HQ Logistics, but that the user wishes to confer with one or more other people in doing so. The user therefore activates a collaborate control 1802 which will provide interactive collaboration with colleagues, for example those in the same organization as the user, or others elsewhere in the business network, or in the Munich DC.

Figure 19:
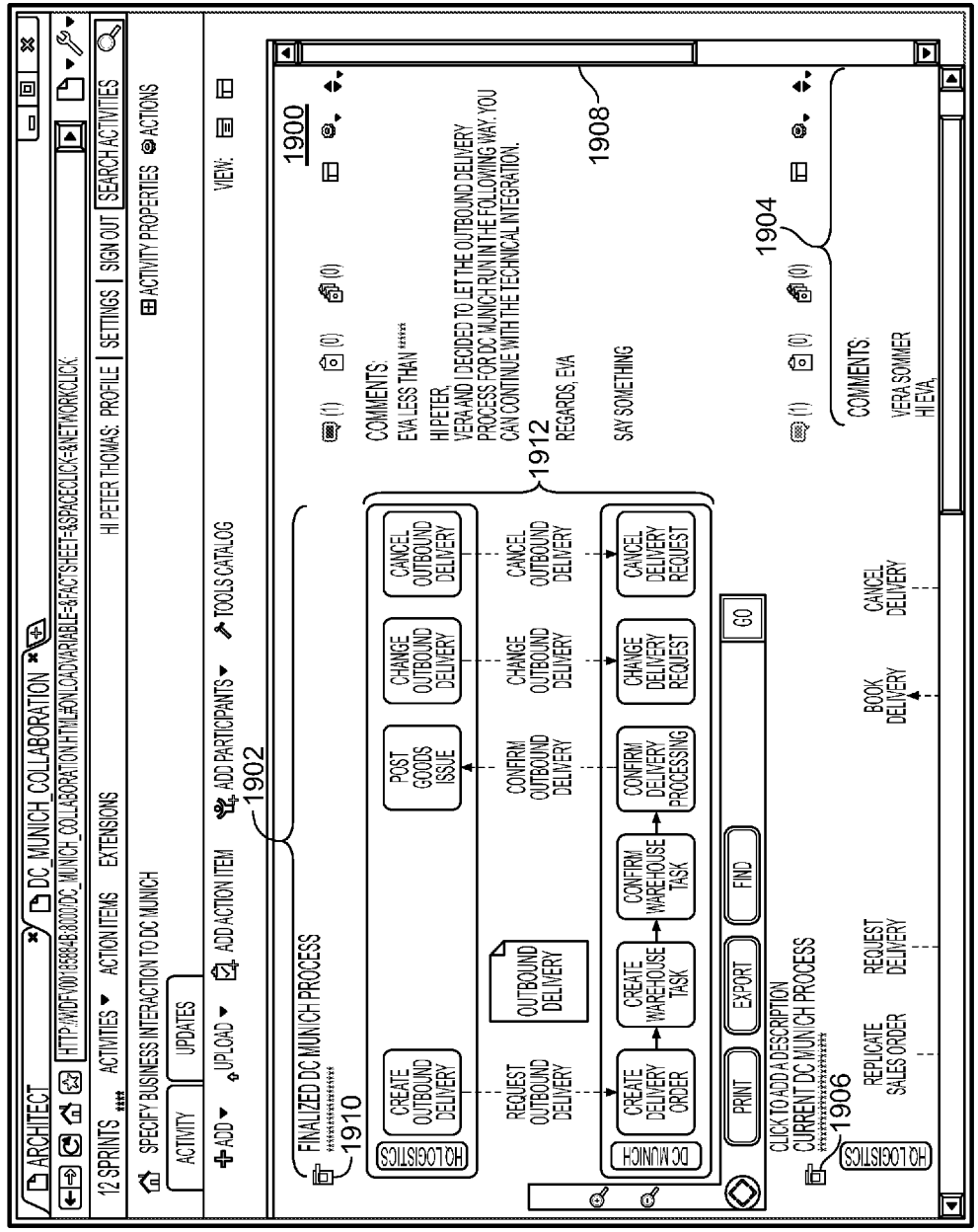
FIG. 19-20 show a business network GUI with a collaboration area.
Figure 20:
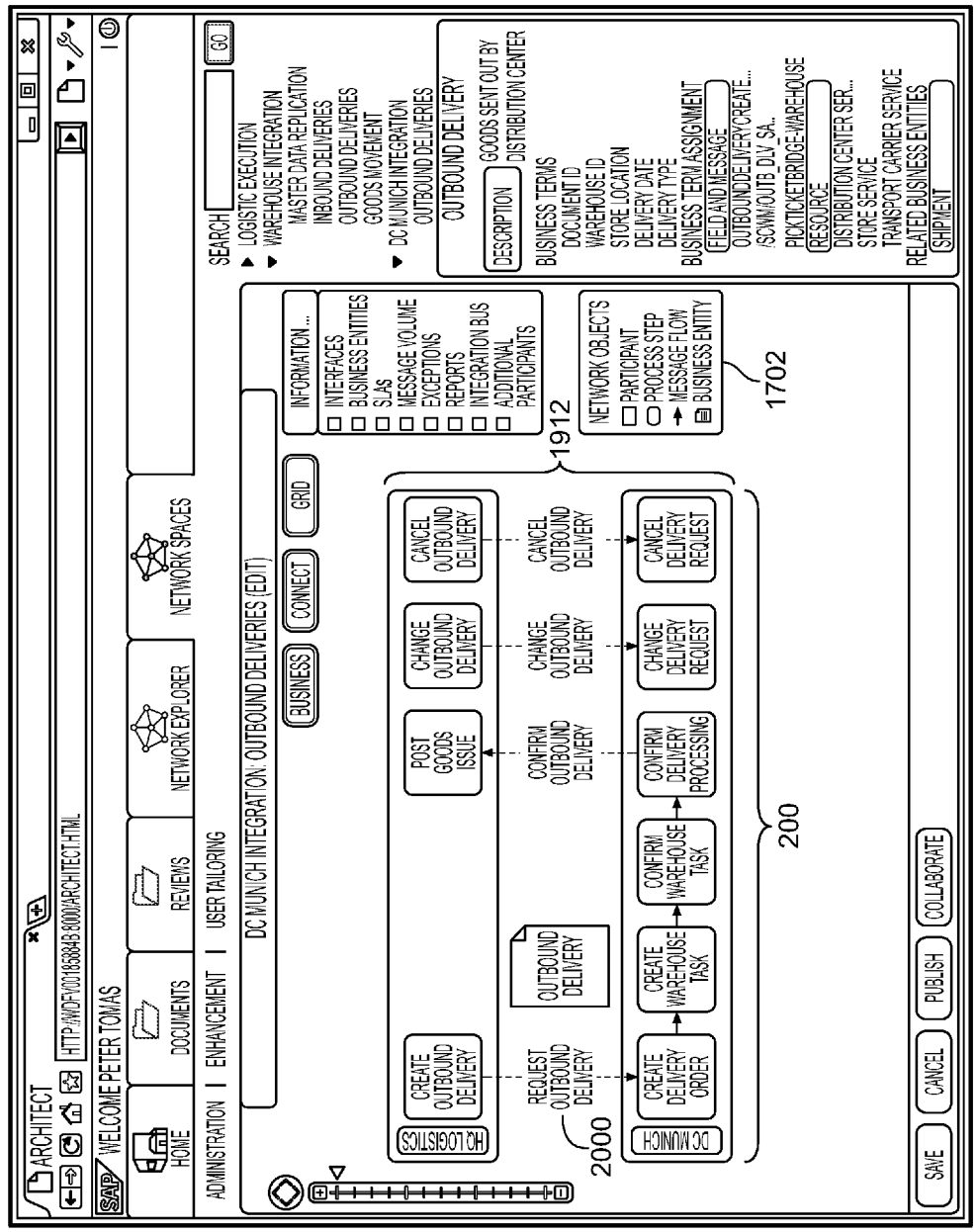

FIG. 19-20 show a business network GUI with a collaboration area 1900. The collaboration area 1900 here includes a process representation area 1902 that can be used to share and modify representations of modeled processes; and a comments area 1904, where the collaborators can post messages to each other. The area 1900 currently shows the final message in a string of interactive collaborations. That is, the user called "Peter" here initially contacted two colleagues, called "Eva" and "Vera," to discuss the outbound delivery process for DC Munich. Prompted by Peter's collaboration invite, Vera sent a message 1906 to Eva in which she forwarded a model representation of the outbound delivery process at it is currently used in the system or systems operated by DC Munich. A scroll bar 1908 indicates that the remainder of the message 1906, as well as Peter's initial message, can be viewed further down in the collaboration area 1900. Based on the received model representation, Eva then responds to Peter with a message 1910 that includes a model 1912 of how Eva and Vera have decided to run the outbound delivery process for DC Munich. The model 1912 is interactive and can be incorporated into a business network model that is being created or edited. Here, Peter decides to include the model 1912 in the ongoing enhancement of the business network model.

FIG. 20 shows the business view area 200 where the model 1912 has been incorporated. For example, the model 1912 is pasted or otherwise imported into the business view area 200. The entity area 1702 can be updated with some other types of entity objects based on the different level of detail.

Particularly, the model 1912 includes multiple interactive objects representing the business flows and other interactions that are part of the outbound delivery process. Among them is an object 2000 that here represents a request regarding outbound delivery, the request sent from HQ Logistics to DC Munich. The user now activates the object 2000.

Figure 21:
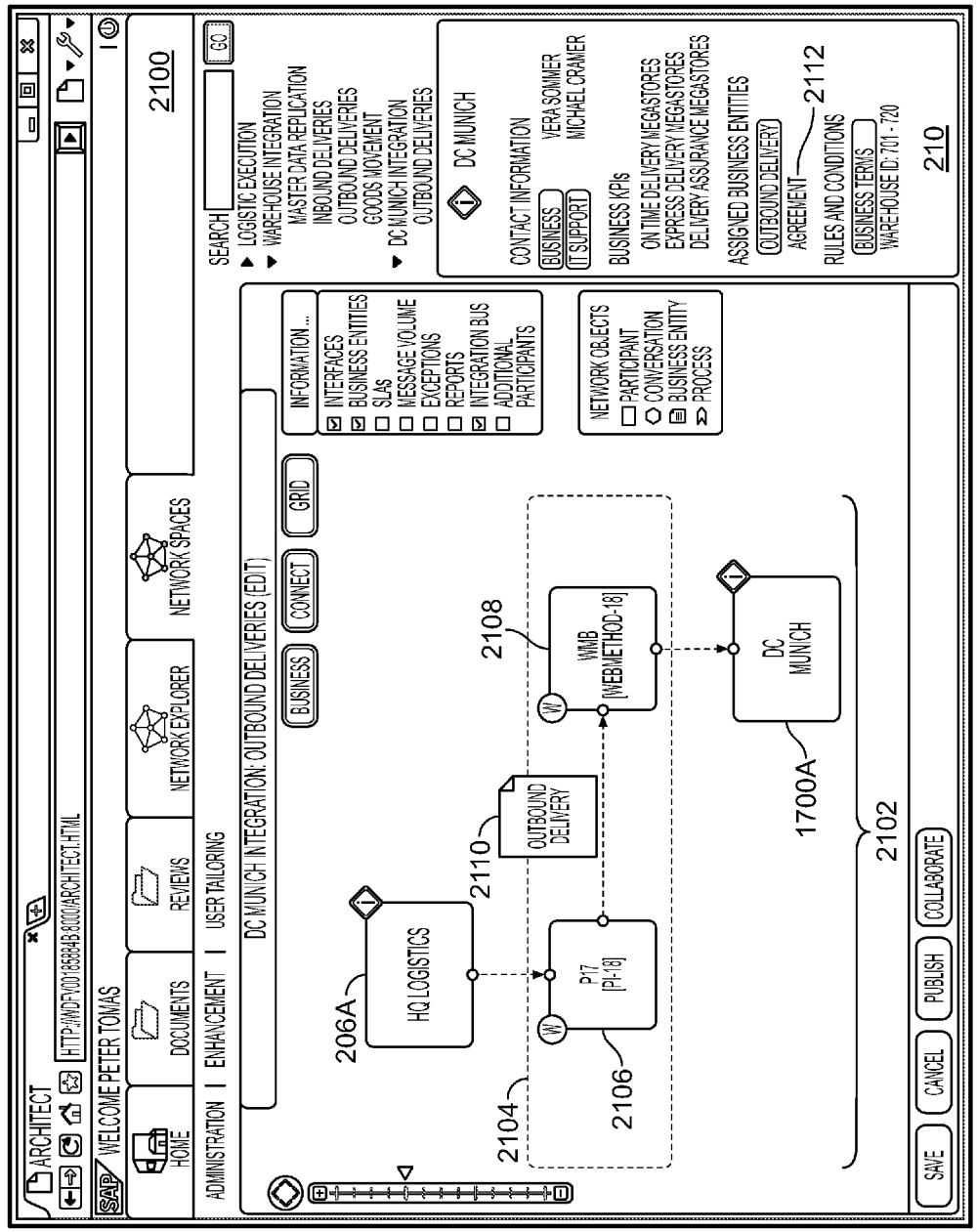
FIG. 21 shows a business network GUI with a grid view area.

FIG. 21 shows a business network GUI 2100 with a grid view area 2102. The grid view area 2102 here shows the objects 206A and 1700A connected by a middleware layer 2104. The middleware layer 2104 here includes a process integration object 2106, for example corresponding or similar to the object 302B (FIG. 3). The middleware layer 2104 here includes a middleware object 2108 from another provider, here WebMethod-IS. Finally, the grid view area 2102 includes an object 2110 representing an outbound delivery document that is to be used in the business communications between the HQ Logistics and DC Munich business entities. For example, the outbound delivery document is specified by information gained through the collaboration and/or existing configuration of the system operated by HQ Logistics. That is, the business network GUI 2100 in a sense represents a result of the user's enhancement of the model for the existing business network to incorporate DC Munich.

The business network GUI 2100 can be used as a tool in negotiations or other interactions regarding the proposed integration. In some implementations, a contract negotiation that is being conducted can make use of the business network GUI 2100 to aid the parties in understanding and exploring the respective rights and obligations that might apply to them if agreement is reached. For example, the information area 210 can link to an agreement document 2112 that is being prepared to memorialize an agreement regarding the integration of the Munich distribution center into the business network.

In such a negotiation, the business network GUI 2100 can display a business network view to negotiation parties who are currently in negotiation. The business network view can include any business view area, connect view area or grid view area described above, to name a few examples. The business network view is then modified based on input. For example, the input can come from any or all of the parties, or from a third party such as a mediator. The modification can involve, but is not limited to, any or all of the business network aspects that have been described above. For example, the modification can affect the parties' respective duties in any of the message flows that constitute an outbound delivery process. For example, any of the parties can enter the modification into the system that generates the business network GUI 2100.

A modified business network view is then displayed based on the modification. That is, the modified business network includes a change in the rights or obligations of at least one of the negotiation parties. If agreement is reached on the modification that was proposed and visualized, the agreement document 2112 is updated and stored. Such a process can be repeated iteratively, for example with alternating inspections of corresponding business view, connect view or grid view areas.

Figure 22:
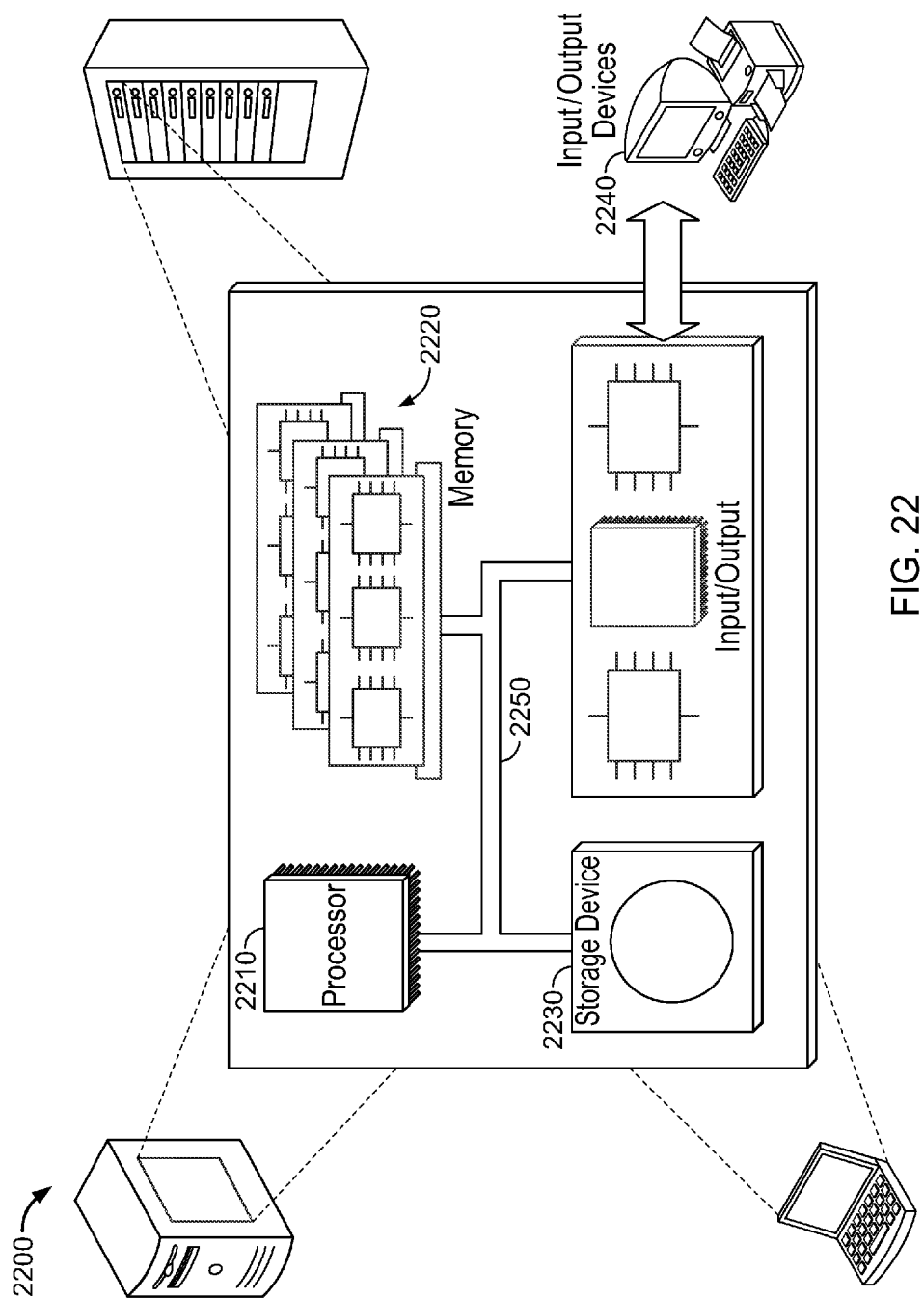
FIG. 22 is a block diagram of a computing system that can be used in connection with computer-implemented methods described in this document.

FIG. 22 is a schematic diagram of a generic computer system 2200. The system 2200 can be used for the operations described in association with any of the computer-implement methods described previously, according to one implementation. The system 2200 includes a processor 2210, a memory 2220, a storage device 2230, and an input/output device 2240. Each of the components 2210, 2220, 2230, and 2240 are interconnected using a system bus 2250. The processor 2210 is capable of processing instructions for execution within the system 2200. In one implementation, the processor 2210 is a single-threaded processor. In another implementation, the processor 2210 is a multi-threaded processor. The processor 2210 is capable of processing instructions stored in the memory 2220 or on the storage device 2230 to display graphical information for a user interface on the input/output device 2240.

The memory 2220 stores information within the system 2200. In some implementations, the memory 2220 is a computer-readable medium. The memory 2220 is a volatile memory unit in some implementations and is a non-volatile memory unit in other implementations.

The storage device 2230 is capable of providing mass storage for the system 2200. In one implementation, the storage device 2230 is a computer-readable medium. In various different implementations, the storage device 2230 may be a floppy disk device, a hard disk device, an optical disk device, or a tape device.

The input/output device 2240 provides input/output operations for the system 2200. In one implementation, the input/output device 2240 includes a keyboard and/or pointing device. In another implementation, the input/output device 2240 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method, comprising:
   receiving, by a computing system, data that identifies a plurality of participants in a business network and data that identifies relationships among the plurality of participants, wherein the plurality of participants includes a first business organization and a second business organization, the first business organization being distinct from the second business organization, the first business organization being geographically remote from the second business organization;
   generating, by the computing system, a business network graph that includes a plurality of nodes and a plurality of edges, wherein:
   (i) for each respective participant among the plurality of participants, the plurality of nodes includes a respective node that corresponds to the respective participant, and
   (ii) the plurality of edges form connections among particular ones of the plurality of nodes based on the data that identifies the relationships among the plurality of participants;
   displaying, within a graphical user interface and on an electronic display of the computing system, a business view mode representation of the business network graph, wherein:
   (i) the business view mode representation of the business network graph shows, for each respective node among the plurality of nodes, (a) the respective node and (b) in proximity of the respective node, a business name of the respective participant in the business network that corresponds to the respective node, and
   (ii) the business view mode representation of the business network graph shows, for each respective edge among the plurality of edges, (a) the respective edge and (b) in proximity of the respective edge, a representation of a type of real-world business interaction between the respective participants in the business network whose corresponding nodes are connected by the respective edge;
   receiving, while displaying the business view mode representation of the business network graph, an indication that first user input has selected, within the graphical user interface, a view mode control that is configured to change a type of information shown in proximity of each of the plurality of nodes in the business network graph, and to change a type of information shown in proximity of each of the plurality of edges in the business network graph, without adding or removing nodes or edges from a display of the business network graph; and
   in response to receiving the indication that the first user input has selected the view mode control, changing from displaying the business view mode representation of the business network graph to displaying a connect view mode representation of the business network graph, wherein:
   (i) the connect view mode representation of the business network graph shows, for each respective node among the plurality of nodes, (a) the respective node and (b) in proximity of the respective node, a representation of a software application that the respective participant in the business network that corresponds to the respective node uses to electronically interface with other participants of the plurality of participants in the business network when performing cross-organizational activities related to services of the business network,
   (ii) the connect view mode representation of the business network graph shows, for each respective edge among the plurality of edges, (a) the respective edge and (b) in proximity of the respective edge, a representation of a type of computer-network interaction between the software applications of the respective participants in the business network whose corresponding nodes are connected by the respective edge, and
   (iii) changing from displaying the business view mode representation of the business network graph to displaying the connect view mode representation of the business network graph includes, for each respective edge among the plurality of edges, replacing the representation of the type of real-world business interaction shown in proximity of the respective edge with the representation of the type of computer-network interaction between the software applications of the respective participants in the business network graph whose corresponding nodes are connected by the respective edge.

2. The computer-implemented method of claim 1, further comprising:
receiving, while displaying the business view mode representation of the business network graph or while displaying the connect view mode representation of the business network graph, an indication that second user input has selected a details-level control within the graphical user interface;
wherein the computing system is configured to:
(i) as a result of receiving the indication that the second user input has selected the details-level control while the business view mode representation of the business network graph was being displayed, cause additional information about the respective participants that correspond to each of at least a subset of the nodes to be shown in proximity of respective nodes in the at least the subset of the nodes, the additional information not having been shown before the indication of the second user input was received, and
(ii) as a result of receiving the indication that the second user input has selected the details-level control while the connect view mode representation of the business network graph was being displayed, cause additional information about the respective participants that correspond to each of at least a subset of the nodes to be shown in proximity of respective nodes in the at least the subset of the nodes, the additional information not having been shown before the indication of the second user input was received.

3. The computer-implemented method of claim 1, wherein:
the view mode control is a first view mode control, and the method further comprises:
receiving, while displaying the connect view mode representation of the business network graph, an indication that second user input has selected, within the graphical user interface, a second view mode control that is configured to change a type of information shown in proximity of each of the plurality of edges in the business network graph without adding or removing nodes or edges from a display of the business network graph; and
in response to receiving the indication that the second user input has selected the second view mode control, changing from displaying the connect view mode representation of the business network graph to displaying a third representation of the business network graph in a grid view mode that shows, in proximity of at least one edge, a representation of a middleware component that interfaces the respective software applications of the respective participants in the business network that correspond to the nodes connected by the at least one edge.

4. The computer-implemented method of claim 1, wherein:
the view mode control is a first view mode control, and the method further comprises:
receiving, while displaying the connect view mode representation of the business network graph, an indication that second user input has selected a second view mode control within the graphical user interface; and
in response to receiving the indication that the third second user input has selected the second view mode control, changing from displaying the connect view mode representation of the business network graph to displaying the business view mode representation of the business network graph.

5. The computer-implemented method of claim 1, wherein the software application that a first participant among the plurality of participants uses to electronically interface with other participants in the business network is an enterprise resource planning software application.

6. The computer-implemented method of claim 1, further comprising:
displaying a search function control within the graphical user interface;
receiving a query that second user input has submitted through the search function control; and
generating a search result that is responsive to the received query and that identifies a particular participant in the business network from among the plurality of participants.

7. The computer-implemented method of claim 6, further comprising, in response to generating the search result, automatically displaying a third representation of the business network graph in a zoomed-in view that shows only a proper subset of all the nodes that were shown at a time when the query was received, wherein the proper subset of all the nodes includes the respective node that corresponds to the particular participant in the business network that is identified by the search result.

8. The computer-implemented method of claim 1, further comprising:
displaying a snapshot function control within the graphical user interface;
receiving an indication that second user input has selected the snapshot function control; and
in response to receiving the indication that the second user input has selected the snapshot function control, storing information that indicates a current state of the business network.

9. The computer-implemented method of claim 2, wherein:
the details-level control is a slider control,
receiving the indication that the second user input has selected the details-level control comprises receiving an indication that the second user input has dragged the slider control by a first distance within the graphical user interface, and
the computing system is configured to adjust, based on the first distance, an amount of the additional information that is caused to be shown as a result of receiving the indication that the second user input has selected the details-level control.

10. The computer-implemented method of claim 1, wherein:
the connect view mode representation of the business network graph shows, for a first node among the plurality of nodes that corresponds to the first business organization, a representation of a first software application that the first business organization uses to electronically interface with other participants of the plurality of participants in the business network when performing cross-organizational activities related to services of the business network; and the connect view mode representation of the business network graph shows, for a second node among the plurality of nodes that corresponds to the second business organization, a representation of a second software application that the second business organization uses to electronically interface with other participants of the plurality of participants in the business network when performing cross-organizational activities related to services of the business network, the second software application being different from the first software application, the representation of the second software application being different from the representation of the first software application.

11. The computer-implemented method of claim 1, wherein the representation of the type of real-world business interaction that is shown in proximity of a first edge among the plurality of edges in the business view mode representation of the business network graph indicates a delivery process for goods shipped between the first business organization and the second business organization.

12. A computer program product tangibly embodied in a non-transitory computer-readable storage medium and including instructions that, when executed by a processor, cause performance of operations, comprising:

receiving, by a computing system, data that identifies a plurality of participants in a business network and data that identifies relationships among the plurality of participants, wherein the plurality of participants includes a first business organization and a second business organization, the first business organization being distinct from the second business organization, the first business organization being geographically remote from the second business organization;

generating, by the computing system, a business network graph that includes a plurality of nodes and a plurality of edges, wherein:
  (i) for each respective participant among the plurality of participants, the plurality of nodes includes a respective node that corresponds to the respective participant, and
  (ii) the plurality of edges form connections among particular ones of the plurality of nodes based on the data that identifies the relationships among the plurality of participants;

displaying, within a graphical user interface and on an electronic display of the computing system, a business view mode representation of the business network graph, wherein:
  (i) the business view mode representation of the business network graph shows, for each respective node among the plurality of nodes, (a) the respective node and (b) in proximity of the respective node, a business name of the respective participant in the business network that corresponds to the respective node, and
  (ii) the business view mode representation of the business network graph shows, for each respective edge among the plurality of edges, (a) the respective edge and (b) in proximity of the respective edge, a representation of a type of real-world business interaction between the respective participants in the business network whose corresponding nodes are connected by the respective edge;

receiving, while displaying the business view mode representation of the business network graph, an indication that first user input has selected, within the graphical user interface, a view mode control that is configured to change a type of information shown in proximity of each of the plurality of nodes in the business network graph, and to change a type of information shown in proximity of each of the plurality of edges in the business network graph, without adding or removing nodes or edges from a display of the business network graph; and in response to receiving the indication that the first user input has selected the view mode control, changing from displaying the business view mode representation of the business network graph to displaying a connect view mode representation of the business network graph, wherein:
  (i) the connect view mode representation of the business network graph shows, for each respective node among the plurality of nodes, (a) the respective node and (b) in proximity of the respective node, a representation of a software application that the respective participant in the business network that corresponds to the respective node uses to electronically interface with other participants of the plurality of participants in the business network when performing cross-organizational activities related to services of the business network,
  (ii) the connect view mode representation of the business network graph shows, for each respective edge among the plurality of edges, (a) the respective edge and (b) in proximity of the respective edge, a representation of a type of computer-network interaction between the software applications of the respective participants in the business network whose corresponding nodes are connected by the respective edge, and
  (iii) changing from displaying the business view mode representation of the business network graph to displaying the connect view mode representation of the business network graph includes, for each respective edge among the plurality of edges, replacing the representation of the type of real-world business interaction shown in proximity of the respective edge with the representation of the type of computer-network interaction between the software applications of the respective participants in the business network graph whose corresponding nodes are connected by the respective edge.

13. The computer program product of claim 12, wherein: the view mode control is a first view mode control, and the operations further comprise:

receiving, while displaying the connect view mode representation of the business network graph, an indication that second user input has selected, within the graphical user interface, a second view mode control that is configured to change a type of information shown in proximity of each of the plurality of edges in the business network graph without adding or removing nodes or edges from a display of the business network graph; and in response to receiving the indication that the second user input has selected the second view mode control, changing from displaying the connect view mode representation of the business network graph to displaying a third representation of the business network graph in a grid view mode that shows, in proximity of at least one edge, a representation of a middleware component that interfaces the respective software applications of the respective participants in the business network that correspond to the nodes connected by the at least one edge.

14. The computer program product of claim 12, wherein: the view mode control is a first view mode control, and the operations further comprise:

receiving, while displaying the connect view mode representation of the business network graph, an indication that second user input has selected a second view mode control within the graphical user interface; and in response to receiving the indication that the second user input has selected the second view mode control, changing from displaying the connect view mode representation of the business network graph to displaying the business view mode representation of the business network graph.

15. The computer program product of claim 12, wherein the software application that a first participant among the plurality of participants uses to electronically interface with other participants in the business network is an enterprise resource planning software application.

16. The computer program product of claim 12, wherein the operations further comprise:

displaying a search function control within the graphical user interface;

receiving a query that second user input has submitted through the search function control; and generating a search result that is responsive the received query and that identifies a particular participant in the business network from among the plurality of participants.

17. The computer program product of claim 16, wherein the operations further comprise, in response to generating the search result, automatically displaying a third representation of the business network graph in a zoomed-in view that shows only a proper subset of all the nodes that were shown at a time when the query was received, wherein the proper subset of all the nodes includes the respective node that corresponds to the particular participant in the business network that is identified by the search result.

18. The computer program product of claim 12, wherein the operations further comprise:

displaying a snapshot function control within the graphical user interface;

receiving an indication that second user input has selected the snapshot function control; and in response to receiving the indication that the second user input has selected the snapshot function control, storing information that indicates a current state of the business network.

19. The computer program product of claim 12, wherein the operations further comprise:

receiving, while displaying the business view mode representation of the business network graph or while displaying the connect view mode representation of the business network graph, an indication that second user input has selected a details-level control within the graphical user interface;

causing, as a result of receiving the indication that the second user input has selected the details-level control while the business view mode representation of the business network graph was being displayed, additional information about the respective participants that correspond to each of at least a subset of the nodes to be shown in proximity of respective nodes in the at least the subset of the nodes, the additional information not having been shown before the indication of the second user input was received, and causing, as a result of receiving the indication that the second user input has selected the details-level control while the connect view mode representation of the business network graph was being displayed, additional information about the respective participants that correspond to each of at least a subset of the nodes to be shown in proximity of respective nodes in the at least the subset of the nodes, the additional information not having been shown before the indication of the second user input was received.

20. The computer program product of claim 19, wherein:
the details-level control is a slider control,
the indication of the second user input was received while displaying the business view mode representation of the business network graph,
receiving the indication that the second user input has selected the details-level control comprises receiving an indication that the second user input has dragged the slider control by a first distance within the graphical user interface, and
the computing system is configured to adjust, based on the first distance, an amount of the additional information that is caused to be shown as a result of receiving the indication that the second user input has selected the details-level control.

* * * * *